(12) United States Patent
Nystad et al.

(10) Patent No.: US 8,928,667 B2
(45) Date of Patent: Jan. 6, 2015

(54) RENDERING STROKED CURVES IN GRAPHICS PROCESSING SYSTEMS

(75) Inventors: Jorn Nystad, Trondheim (NO); Rune Holm, Trondheim (NO); Aske Simon Christensen, Trondheim (NO)

(73) Assignee: ARM Limited, Cambridge (GB)

( * ) Notice: Subject to any disclaimer, the term of this patent is extended or adjusted under 35 U.S.C. 154(b) by 1196 days.

(21) Appl. No.: 12/588,172

(22) Filed: Oct. 6, 2009

(65) Prior Publication Data

US 2010/0097382 A1    Apr. 22, 2010

(30) Foreign Application Priority Data

Oct. 6, 2008 (GB) .................................. 0818278.4

(51) Int. Cl.
*G06T 11/20* (2006.01)
(52) U.S. Cl.
CPC .................................. *G06T 11/203* (2013.01)
USPC ........................................................... 345/442
(58) Field of Classification Search
None
See application file for complete search history.

(56) References Cited

U.S. PATENT DOCUMENTS

| | | | |
|---|---|---|---|
| 4,855,934 A | 8/1989 | Robinson | |
| 5,133,052 A * | 7/1992 | Bier et al. | ...................... 715/234 |
| 5,381,521 A | 1/1995 | Ballard | |
| 6,281,902 B1 | 8/2001 | Nagashima | |
| 6,552,725 B1 | 4/2003 | Houtman et al. | |
| 7,239,319 B2 | 7/2007 | Loop | |
| 7,277,096 B2 | 10/2007 | Veach | |
| 7,405,733 B2 | 7/2008 | Helie et al. | |
| 7,432,937 B2 | 10/2008 | Poddar et al. | |
| 7,499,055 B2 * | 3/2009 | Lin et al. | ....................... 345/467 |
| 7,589,730 B1 | 9/2009 | Brown | |
| 7,629,400 B2 | 12/2009 | Hyman | |

(Continued)

FOREIGN PATENT DOCUMENTS

| CN | 10104688 A | 10/2007 |
|---|---|---|
| CN | 101051390 A | 10/2007 |

(Continued)

OTHER PUBLICATIONS

Office Action mailed Mar. 19, 2012 in co-pending U.S. Appl. No. 12/588,175.

(Continued)

*Primary Examiner* — Aaron M Richer
*Assistant Examiner* — Anh-Tuan V Nguyen
(74) *Attorney, Agent, or Firm* — Nixon & Vanderhye P.C.

(57) ABSTRACT

When rendering a stroked curve for display in a graphics processing system, an input stroked curve 1 defined in user space 2 is received by the system. The portion of a canonical space 5 that corresponds to the received stroked curve 1 is determined by determining the portion of a canonical curve 12 defined in the canonical space 5 that corresponds to the received stroked curve 1. Then, for each of a plurality of sampling points within one or more primitives 4 that are generated to cover the received stroked curve 1' following its projection into surface space 3, it is determined whether a corresponding location in canonical space 5 (to the sampling point in surface space 3) is within the portion of the canonical space that corresponds to the received stroked curve, e.g. by looking up suitable information that has been stored (in advance) in one or more graphics textures. Data for rendering the received stroked curve 1 (e.g. RGBA values) is then assigned to each of the plurality of sampling points based on the determination.

14 Claims, 9 Drawing Sheets

(56) References Cited

U.S. PATENT DOCUMENTS

| | | | |
|---|---|---|---|
| 7,657,071 | B2 | 2/2010 | Bartesaghi et al. |
| 7,746,342 | B2 | 6/2010 | Yamada |
| 7,868,887 | B1* | 1/2011 | Yhann ............................ 345/442 |
| 8,068,106 | B1 | 11/2011 | Yhann et al. |
| 8,300,052 | B1 | 10/2012 | Hetu |
| 2002/0158881 | A1 | 10/2002 | Van Welzen |
| 2003/0197708 | A1 | 10/2003 | Frisken et al. |
| 2004/0037467 | A1 | 2/2004 | Wenzel et al. |
| 2004/0189662 | A1 | 9/2004 | Frisken et al. |
| 2005/0017969 | A1* | 1/2005 | Sen et al. ...................... 345/419 |
| 2005/0063582 | A1 | 3/2005 | Park et al. |
| 2006/0017955 | A1 | 1/2006 | Owen et al. |
| 2006/0023933 | A1 | 2/2006 | Mitsui |
| 2006/0133691 | A1 | 6/2006 | Neto et al. |
| 2006/0256112 | A1 | 11/2006 | Heirich et al. |
| 2006/0256115 | A1 | 11/2006 | Cao et al. |
| 2007/0002053 | A1 | 1/2007 | Hill et al. |
| 2007/0097123 | A1 | 5/2007 | Loop et al. |
| 2007/0211061 | A1 | 9/2007 | Kokojima |
| 2007/0229506 | A1 | 10/2007 | Sugita et al. |
| 2008/0120075 | A1* | 5/2008 | Wloka ............................... 703/9 |
| 2008/0309676 | A1* | 12/2008 | Nehab et al. .................. 345/582 |
| 2009/0237401 | A1 | 9/2009 | Wei et al. |
| 2009/0285482 | A1* | 11/2009 | Epshtein et al. .............. 382/176 |
| 2010/0124383 | A1 | 5/2010 | Wang et al. |
| 2011/0109625 | A1 | 5/2011 | Yamada |
| 2013/0120391 | A1* | 5/2013 | Brown ............................ 345/441 |

FOREIGN PATENT DOCUMENTS

| | | |
|---|---|---|
| CN | 101189600 A | 5/2008 |
| EP | 0 624 849 | 11/1994 |
| EP | 0763930 A1 | 3/1997 |
| JP | H06 274149 | 9/1994 |
| JP | 06 309417 | 11/1994 |
| JP | H07-006233 | 1/1995 |
| JP | H0777968 | 3/1995 |
| JP | 11-175740 | 7/1999 |
| JP | A 11-296699 | 10/1999 |
| JP | H11296699 | 10/1999 |
| JP | 2004-054584 | 2/2004 |
| JP | 2007-073043 | 3/2007 |
| JP | 2007 537815 | 12/2007 |
| WO | WO 2005/088553 A1 | 9/2005 |
| WO | WO 2005/114575 | 12/2005 |
| WO | WO 2007/005537 | 1/2007 |

OTHER PUBLICATIONS

Office action mailed Oct. 25, 2012 in co-pending U.S. Appl. No. 12/588,175.
Office action mailed Sep. 17, 2012 in co-pending U.S. Appl. No. 12/588,177.
Office action mailed Jul. 17, 2012 in co-pending U.S. Appl. No. 12/588,171.
Search Report, Mar. 17, 2009, in corresponding Great Britain Application No. GB0818278.4.
Search and Examination Report, Jan. 19, 2010, in corresponding Great Britain Application No. GB0917510.0.
Taubin, Distance Approximations for Rasterizing Implicit Curves, ACM Transactions on Graphics, vol. 13, No. 1, Jan. 1994, pp. 3-42.
TASI, Vector Graphics Illustrated Glossary, last reviewed Nov. 2006, pp. 1-6.
TASI, An Introduction to the Vector Image Format, last reviewed Mar. 2005, pp. 1-6.
Huang et al., Implementation of an Open VG Rasterizer with Configurable Anti-aliasing and Multi-window Scissoring, Proceedings of the Sixth IEEE International Conference on Computer and Information Technology, 2006 IEEE.
Loop et al., Resolution Independent Curve Rendering using Programmable Graphics Hardware, Copyright 2005 by Association for Computing Machinery, Inc. pp. 1000-1009.
Search and Examination Report, Jan. 19, 2010, in corresponding Great Britain Application No. GB0917511.8.
Search Report, Mar. 12, 2009, in corresponding Great Britain Application No. GB0818277.6.
Search and Examination Report, Jan. 27, 2010, in corresponding Great Britain Application No. GB0917508.4.
Search Report, Mar. 20, 2009, in corresponding Great Britain Application No. GB0818280.0.
Search Report, Mar. 20, 2009, in corresponding Great Britain Application No. GB0818279.2.
Search and Examination Report, Jan. 26, 2010, in corresponding Great Britain Application No. GB0917509.2.
P. Sen, Silhouette Maps for Improved Texture Magnification, Graphics Hardware (2004), pp. 65-73 and 147.
G. Ramanarayanan et al., Feature-Based Textures, Eurographics Symposium on Rendering (2004), 10 pgs.
wglUseFontBitmaps, 2008 Microsoft Corporation, 3 pgs, http://msdn.microsoft.com/en-us/library/ms537557(VS.85.printer).aspx.
English Translation of Chinese Office Action mailed Jan. 11, 2013 in Chinese Application No. 200910179092.3.
Office Action mailed Jan. 9, 2013 in U.S. Appl. No. 12/588,171.
Office Action mailed Jul. 5, 2012 in U.S. Appl. No. 12/588,171.
United Kingdom Examination Report dated Feb. 27, 2013 in Application No. GB0917509.2.
C. Green, Improved Alpha-Tested Magnification for Vector Textures and Special Effects, published 2007, see whole document, 5 pages.
English Translation of Chinese Office Action mailed Feb. 7, 2013 in Chinese Application No. 200910179578.7.
English Translation of Chinese Search Report mailed Feb. 7, 2013 in Chinese Application No. 200910179578.7.
Z. Su, The Applying Research of Bicubic Patch, Mechanical & Engineering Technology, vol. 32, Issue 6, Dec. 31, 2003, pp. 26-27—No English Translation.
Y. Ke et al., Parallel Scatterplots: Visual Analysis with GPU, Journal of Computer-Aided Design & Computer Graphics, vol. 20, Issue No. 9, Sep. 30, 2008, pp. 1219-1228—Abstract.
U.S. Appl. No. 12/588,171, filed Oct. 6, 2009; Inventor: Nystad et al.
U.S. Appl. No. 12/588,175, filed Oct. 6, 2009; Inventor: Nystad et al.
U.S. Appl. No. 12/588,177, filed Oct. 6, 2009; Inventor: Nystad et al.
UK Examination Report dated Apr. 8, 2011 for GB 0917509.2.
English Translation of Chinese Office Action mailed Mar. 29, 2013 in Chinese Application No. 200910178762.
English Translation of Chinese Search Report mailed Mar. 29, 2013 in Chinese Application No. 200910178762.
Office Action mailed May 28, 2013 in U.S. Appl. No. 12/588,175.
English Translation of Japanese Office Action, dated Nov. 19, 2013 in JP Application No. 2009-231899, 4 pgs.
English translation of Japanese Official Action dated Nov. 19, 2013 in JP Application No. 2009-231900, 4 pgs.
Chinese Office Action and English Translation, dated Dec. 3, 2013 in CN Application No. 200910179092.3, 13 pgs.
English Translation of Chinese Office Action mailed Aug. 28, 2013 in Chinese Application No. 200910178763.4.
Office Action mailed Oct. 15, 2013 in U.S. Appl. No. 12/588,175.
English translation of Chinese Official Action dated Oct. 16, 2013 in Chinese Application No. 2009-10179578.7, 4pgs.
English translation of Japanese Official Action dated Nov. 12, 2013 in Japanese Application No. 2009-231898, 2 pgs.

* cited by examiner

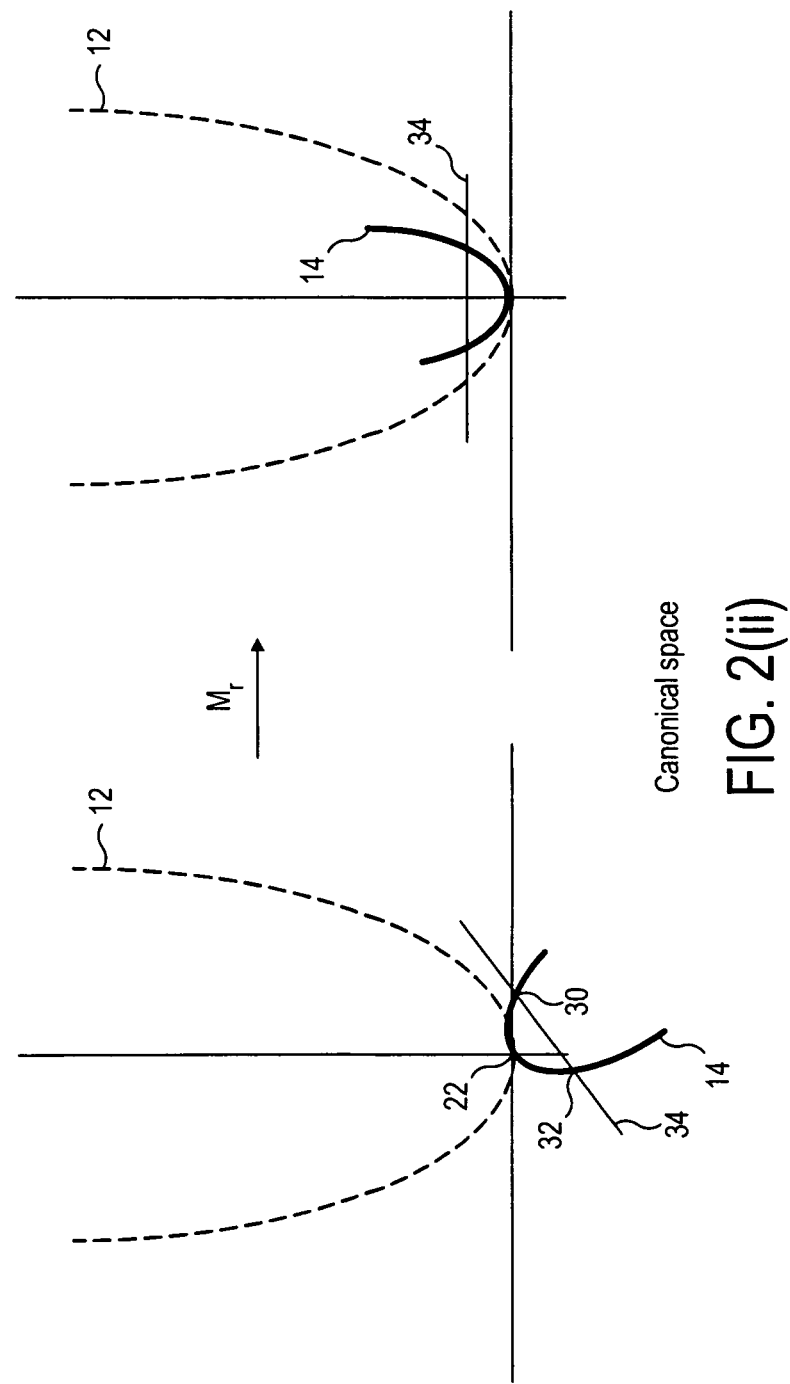

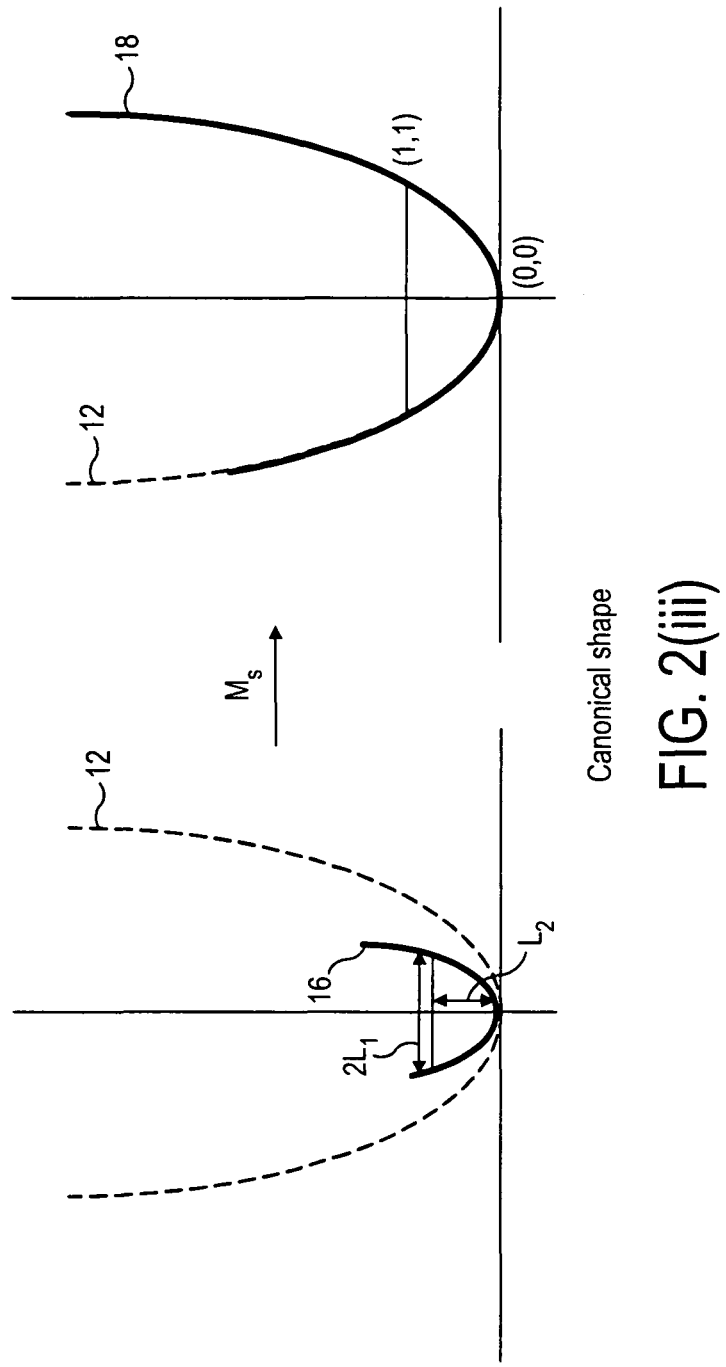
FIG. 2(iii)

RENDERING STROKED CURVES IN GRAPHICS PROCESSING SYSTEMS

This application claims priority to United Kingdom Application No. GB 0818278.4 filed 6 Oct. 2008, the entire contents of which is hereby incorporated by reference.

The present invention relates to the process of rendering images in computer graphics systems, and in particular to the rendering of stroked curves in such systems.

BACKGROUND

In recent years in has become increasingly common to utilise vector graphics in computer graphics. As is known, in the art, one key advantage of vector graphics over raster graphics is the ability to provide resolution-independent images, i.e. images that can essentially be scaled indefinitely without degrading. For example, the individual characterisers in computer fonts, such as TrueType™, are typically stored as vector images.

Vector graphics are based on the use of individually defined geometrical objects, and are typically described by one or more line segments, e.g. straight lines or curves (such as quadratic (bezier) curves, elliptical arcs, cubic (bezier) curves) that are connected together at anchor points to form a path.

Vector graphics objects/paths are defined and manipulated in a space, commonly known as "user space". In order to output the vector graphics objects/paths to a video display or printer, however, the objects/paths as defined in user space need to be converted into a suitable form so as to be displayed on a screen or to be outputted on a printer. This conversion typically involves projecting the objects/paths as defined in user space to another space, commonly referred to as "surface space", that corresponds to the perspective (geometry) of the output display on which the objects/paths are to be viewed. The transformation between user space and surface space is typically referred to as the "user-to-surface transformation".

Once the vector graphics objects/paths have been converted into surface space representations, they are then rendered.

This process, as is known in the art, typically involves generating one or more graphics primitives, such as triangles, that cover the surface space representations of the objects/paths and rasterising the primitives to a plurality of sampling points within the primitives which are then sampled to determine whether each sampling point falls within the projected objects/paths or not. Based on this determination, the plurality of sampling points are assigned data, such as red, green and blue (RGB) colour values and an "alpha" transparency value, as appropriate to allow the objects/paths to be correctly displayed. These processes are commonly referred to as rasterising and shading, respectively.

(In 3D graphics literature, the term "rasterisation" is sometimes used to mean both object conversion to sample positions and shading. However, herein, rasterisation will be used to refer to converting object data to sampling point addresses only.)

These processes are typically carried out, as is known in the art, by representing the sampling points using discrete graphical entities usually referred to as "fragments" on which the graphics processing operations (such as shading) are carried out. Thus, the fragments are, in effect, the graphics entities that are processed by the graphics processing system (that pass through the graphics pipeline).

Each fragment can reasonably be thought of as being effectively equivalent to a "pixel" of the scene being processed. Each fragment may correspond to a single or to plural sampling points. Each fragment may correspond to a single pixel (picture element) in the final display (since as the pixels are the singularities in the final display, there may be a one-to-one mapping between the fragments the graphics processor operates on and the pixels of the display). More typically, however, it will be the case that there is not a one-to-one correspondence between a fragment and a display pixel, for example where particular forms of post-processing, such as down-scaling, are carried out on the rendered image prior to displaying the final image.

Two types of objects that are commonly found in vector graphics are "filled" objects and stroked objects. The process of filling involves applying a single block of colour, gradient, pattern or image to the area within an object or closed path. The process of stroking meanwhile can be thought of effectively as adding a width to the path by dragging a line-shaped pen tip of a particular width along the path. More specifically, the centre point of the pen-tip follows the path, and the tip is orientated so as to always be perpendicular to the path. Equivalently, therefore, the boundary of a stroked path can also be defined by the set of points from which a line of length (at most) w/2 (for a stroked path of width w), and which is perpendicular to the path, can be drawn to a point on the path.

The rendering of stroked paths, and of stroked curves in particular, is traditionally an expensive operation in terms of load on the CPU. For example, one common method of rendering a stroked path is to subdivide the path into a plurality of individual lines or filled paths on the CPU, which can then each be rendered separately. However, this is a processing-intensive operation. Another method that is often used for rendering stroked paths is to use dedicated curve rendering hardware. However, although this method does offer a solution to the reduction in performance associated with the above described subdivision technique, it requires dedicated hardware, which, for example, is not always available or desirable in graphics processing systems.

The Applicants accordingly believe there is scope for further techniques for rendering stroked paths, and in particular stroked curves, e.g. that may not need to use additional, dedicated hardware, but that can still achieve an improved level of performance in comparison to known subdivision techniques.

SUMMARY OF INVENTION

According to a first aspect of the present invention, there is provided a method of rendering a stroked curve for display in a graphics processing system, the method comprising:

receiving an input stroked curve defined in user space;

determining the portion of a canonical space that corresponds to the received stroked curve by determining the portion of a canonical curve defined in the canonical space that corresponds to the received stroked curve;

projecting the received stroked curve using a received transformation into surface space;

defining one or more primitives that cover the projected stroked curve in surface space;

for each of a plurality of sampling points within the one or more primitives, determining whether a corresponding location in canonical space is within the portion of the canonical space that corresponds to the received stroked curve; and assigning data for rendering the received stroked curve to one or more of the plurality of sampling points in surface space in accordance with said step of determining whether a corresponding location in canonical space is within the portion of canonical space that corresponds to the received stroked curve.

According to a second aspect of the present invention, there is provided an apparatus for rendering a stroked curve for display in a graphics processing system, the apparatus comprising:

means for receiving an input stroked curve defined in user space;

means for determining the portion of a canonical space that the input stroked curve corresponds to by determining the portion of a canonical curve defined in the canonical space that corresponds to the received stroked curve;

means for projecting the received stroked curve using a received transformation into surface space;

means for defining one or more primitives that cover the projected stroked curve in surface space;

means for, for each of a plurality of sampling points within the one or more primitives, determining whether a corresponding location in canonical space is within the portion of canonical space that corresponds to the received stroked curve; and means for assigning data for rendering the received stroked curve to one or more of the plurality of sampling points in surface space in accordance with said determination of whether a corresponding location in canonical space is within the portion of canonical space that corresponds to the received stroked curve.

In the present invention, an input stroked curve is rendered by first mapping the input stroked curve to a corresponding portion of a predefined curve that has been defined in a "canonical space". Then, positions in canonical space are sampled (tested) to determine whether corresponding positions in surface space fall within the input stroked curve.

This is in contrast to directly determining whether a sampling point in surface space is within the projected stroked curve (and thus directly determining information about each and every stroked curve that is received by the graphics processing system for rendering), which is often not feasible or straightforward thereby leading to the use of the prior art techniques discussed above.

The Applicants have, however, recognised that all curves within certain families of curves can be transformed using only translation, rotation and uniform scaling onto at least a portion of a predefined, single or fundamental curve, referred to herein as a "canonical curve".

This therefore allows information about a single curve, i.e. the canonical curve, to be used to determine information about a plurality of stroked curves that are received by the graphics processing system for rendering. In other words, instead of, for example, having to derive or store data in relation to each individual stroked curve that is received by the graphics processing system to be rendered, it is only necessary to derive or store data about the canonical curve. This data can then be used to render the each of the individual stroked curves that belong to the family (set) of stroked curves that the "canonical curve" represents.

Moreover, because an appropriate given input stroked curve can be transformed to such a corresponding canonical curve using only translation, rotation and uniform scaling, then, as will be discussed further below, that allows the portion of the canonical curve that corresponds to the received stroked curve, the "stroked canonical curve segment", such as its start and end points to be readily determined in use. It similarly allows the width of the stroked curve as it will appear in canonical space to be readily determined in use.

For example, because an input stroked curve can be mapped to its corresponding canonical curve using, inter alia, uniform scaling, the stroke width, which is a single value in user space, will remain a single value, albeit typically a different value (namely the stroke width in user space multiplied by any scaling factor associated with the transformation between user space and canonical space), in canonical space. (This is in contrast, for example, to the transformation between user space and surface space, which typically includes non-uniform scaling, and so the single width value of the stroked curve in user space following its projection into surface space will typically become multi-valued (i.e. the width will vary along the length of the stroked curve)).

Thus, not only can the present invention provide a more efficient mechanism for rendering stroked curves, it provides a particularly convenient mechanism for doing so.

The present invention can be used with any form of stroked curve for which there can be derived a "canonical curve" having the properties as described above. Thus, the input stroked curve received by the graphics processing system can be any curve from a family of curves that can have an appropriate associated canonical curve.

One family of curves that can have an associated canonical curve of this form are quadratic curves. In this case the canonical curve will be the fundamental quadratic curve, i.e. a curve of the form $y=x^2$.

Accordingly, in a particularly preferred embodiment, the stroked curve in user space received by the graphics processing system is a quadratic curve.

The stroked curve that is defined in user space that is received as an input to the process of the present invention may be defined in any desired and suitable manner.

For example, and preferably, the graphics processing system may receive information defining the stroked curve such as the position of the curve and any parameters relating to the curve.

As described above, the received (or input) stroked curve is preferably defined in user space by a centre curve and an associated stroked width. The centre curve of the stroked curve (stroke) is preferably defined by the position of a plurality of control points in user space, typically comprising a start point, an end point and one or more intermediate points, together with an indication of the type of curve to be drawn between the start and end control points. For example, and preferably, the centre curve of the stroke comprises one of: a quadratic bezier curve (requiring a single intermediate control point); a cubic bezier curve (requiring two intermediate control points); and an elliptical arc.

Thus, in a preferred embodiment, the step of or means for receiving a stroked curve defined in user space comprises receiving the position of a plurality of control points in user space, information indicating the type of curve, and the stroke width in user space.

The stroked curve defined in user space that is the input to the process of the present invention may be the stroked curve as initially defined by, e.g., the application that requires the curve to be drawn.

However, it would also be possible, for the input stroked curve to be a curve that is derived from another curve that is defined in user space. For example, it is also contemplated that the input stroked curve may have been derived by transforming another or initial curve into the user space form in which it is received by the present invention.

It is equally contemplated that the input stroked curve may be derived by sub-dividing an initial curve that is defined in user space.

For example, as will be discussed further below, the Applicants have recognised that if a curve that does not have a corresponding curve in canonical space is to be rendered, it may be possible to sub-divide that initial curve into a plurality of curve sections or segments which do each have corresponding canonical curves (which are members of a family of curves that has an associated canonical curve). For example, a cubic or elliptical curve may be sub-divided into a plurality of quadratic curves. This would accordingly allow the present invention to be used to render curves for which there may not be a directly corresponding canonical curve directly defined (and/or stored) or available.

The Applicants have further recognised that it may also be desirable to divide a given stroked curve to be rendered into different sections for rendering, as this may, as will be discussed further below, allow the rendering process to be more straightforward.

Thus, in a particularly preferred embodiment, the present invention further comprises a step of or means for sub-dividing a stroked curve defined in user space into a plurality of stroked curve segments, with one or more of the stroked curve segments then forming the input stroked curve defined in user space that is processed and rendered in the manner of the present invention.

For example, and preferably, if the stroked curve as defined in user space is not a curve that has an associated canonical curve, it can be (is) sub-divided into a plurality of curve segments which are members of a family of curves that have an associated canonical curve. In a preferred such embodiment, where the stroked curve as defined in user space is a cubic curve or a elliptical curve, such a curve is sub-divided into a plurality of quadratic curves, which are then rendered using the present invention.

Thus, it should be noted that references to the input stroked curve herein are intended, unless the context requires otherwise, to refer to the curve that is "input" to the rendering process of the present invention, and that input curve may, e.g., be the curve as initially defined, for example, by the application in question, or a curve derived from the initial "user-defined" curve, such as a sub-section of that curve.

Once the input stroked curve is received by the graphics processing system, it is then necessary to determine the corresponding portion of the canonical space that represents the received stroked curve. This determination can be carried out in any suitable and desired manner.

In a particularly preferred embodiment this is done by determining the transformation needed to take the centre curve of the stroke as defined in user space and place it on the corresponding portion of the canonical curve. As discussed above this transformation (the user-to-canonical transformation) should only require translation, rotation and/or uniform scaling.

Accordingly, the step of or means for determining the transformation that transforms the stroked curve in user space onto the appropriate portion of the canonical curve preferably includes determining a translation portion (component), if any, of the transformation.

The translation portion (component) of the transformation can be determined in any suitable and desired manner. In a particularly preferred embodiment, however, and wherein the received stroked curve (and thus the canonical curve) is a quadratic curve, the translation portion (component) of the transformation is determined by determining the translation needed to move the nadir (i.e. the point of greatest curvature associated with the quadratic curve) of the input stroked curve in user space onto the nadir of the canonical curve.

Thus, in a preferred embodiment, the step of or means for determining the translation portion (component) of the transformation comprises determining the (location of the) nadir of the received stroked curve and the translation needed to map that nadir to the (location of the) nadir of the canonical curve.

(As will be appreciated, the nadir of the stroked curve as defined in user space may be on the centre curve of the defined stroke (i.e. at a location between the start and end control points of the input stroked curve), or it may be on an extrapolated portion of the centre curve of the input stroked curve (i.e. at a location outside of the start and end control points of the input stroked curve). Similarly, the portion of the canonical curve that corresponds to the received stroked curve may contain the nadir of the canonical curve (in the former case), or the portion of the canonical curve that corresponds to the received stroked curve may not contain the nadir of the canonical curve (in the latter case).)

The step of or means for determining the transformation that transforms the stroked curve in user space onto the appropriate portion of the canonical curve similarly preferably includes determining a rotation portion (component), if any, of the transformation.

The rotation portion (component) of the transformation can also be determined in any suitable and desired manner. In a particularly preferred embodiment, however, and again wherein the received stroked curve (and thus the canonical curve) is a quadratic curve, the rotation portion (component) of the transformation is determined by determining the rotation necessary to make a line drawn between two points on the centre curve of the received stroked curve that are equidistant from, and on opposite sides of, the nadir, parallel to a corresponding line drawn for the canonical curve.

The step of or means for determining the transformation that transforms the stroked curve in user space onto the appropriate portion of the canonical curve similarly preferably comprises determining a uniform scaling portion (component), if any, of the transformation.

The uniform scaling portion (component) of the transformation can also be determined in any suitable and desired manner. In a particularly preferred embodiment, however, and again wherein the received stroked curve (and thus the canonical curve) is a quadratic curve, the uniform scaling portion (component) of the transformation is determined by determining the ratio of the length of a first line drawn between two points on the centre curve of the received stroked curve that are equidistant from, and on opposite sides of, the nadir, and a second line drawn from the mid-point of the first line to the nadir, and then determining the scaling factor needed such that this ratio equals the corresponding ratio obtained from the canonical curve.

The steps of determining the translation, rotation and uniform scaling components of the transformation can be performed in any order as desired. In a preferred embodiment of the present invention, however, the translation component is determined first, followed by the rotation component, and finally the uniform scaling component.

Once the transformation needed to map the centre curve of the input stroked curve to the canonical curve has been determined, the portion of canonical space that corresponds to the input stroked curve (i.e. that the input stroked curve covers) is preferably determined by using the determined transformation to determine: the two positions on the canonical curve that correspond to the start and end points of the centre curve of the input stroked curve; and the width the input stroked curve will have in canonical space (which will be the width of the curve in user space multiplied by the scaling factor of the determined user to canonical transformation). This then gives the location of the input stroked curve in the canonical space.

Once the portion (location) of the canonical space that corresponds to the input stroked curve has been determined, the curve can then be rendered.

This is done by first projecting the received stroked curve into surface space using (implementing) a transformation (the user-to-surface transformation) that is received by (input to) the graphics processing system. Therefore, it will be appreciated that the user-to-surface transformation differs from the user-to-canonical transformation in that it is not determined by the graphics processing system, but is instead input to the system as a predefined transformation indicating the mapping needed to project a location in user space to a corresponding location in surface space.

One or more graphics primitives are then generated that cover the stroked curve as it appears in surface space (the projected stroked curve). These one or more graphics primitives can be defined using any suitable and desired techniques as appropriate, such as by defining a bounding box or boxes that cover the projected stroked curve and/or by defining a bounding polygon that tightly fits to the ends of the projected stroked curve, i.e. at the start and end (control) points.

Next, the sampling positions in canonical space that correspond to the sampling points for the generated primitives in surface space are determined (so that it can be determined whether the corresponding locations in canonical space to the sampling points in surface space fall within the location of the stroked curve in canonical space or not).

The corresponding locations for the sampling points in canonical space can be determined in any suitable or desired manner. Preferably, however, a corresponding location is determined by first mapping a sampling point in surface space to a corresponding location in user space using the inverse of the transformation used to project the received stroked curve to surface space (the user-to-surface transformation). The corresponding location in user space is then preferably mapped to a corresponding location in canonical space using the determined transformation that transforms the stroked curve as defined in user space onto the corresponding portion of the canonical curve (the user-to-canonical transformation).

Thus, in a preferred embodiment, the step of or means for determining a corresponding location in canonical space to a sampling point in surface space comprises mapping the sampling point in surface space to a corresponding location in user space, and then mapping the corresponding location in user space to a corresponding location in canonical space.

Following this step, as will be appreciated, the location in canonical space that corresponds to a sampling point in surface space is known.

Once the corresponding sampling location in canonical space has been determined, it is determined whether this location is within the stroked curve as it appears in canonical space or not. This can then be used to determine whether the sampling point in surface space is within the stroked curve or not, and hence to shade the sampling point in surface space accordingly.

The determination of whether the sampling location in canonical space is within the stroked curve as it appears in canonical space or not can be carried out as desired.

However, the Applicants have recognised that for some forms of canonical curves at least, there will exist, for each discrete location (sampling point) in the canonical space, an integer number of points ("solutions") on the canonical curve from which it is possible to draw a (straight) line, which is perpendicular to the canonical curve, to the discrete location (sampling point). Moreover, these one or more points (solutions) on the canonical curve can, as will be discussed in more detail below, be utilised to determine whether the sampling location in canonical space is within a given stroked curve as it appears in canonical space or not.

Firstly, as will be appreciated, the stroked curve in canonical space, and more specifically the corresponding segment of the canonical curve itself, will extend over at least one particular parametric range in canonical space. (The number of distinct parametric ranges depends on the dimension of canonical space.) For example, for a canonical curve of the form $y=x^2$, the curve will extend over a range of "x" values and a range of "y" ($=x^2$) values, and so both "x" and "y" can be used as "parameters" of the curve.

(It should be noted here that the parametric ranges over which a particular canonical curve extends can be represented through any suitable parameterisation of the curve. Therefore, whilst for a canonical curve of the form $y=x^2$ the axes can be, and preferably are, used as parameters, this will not be the case for all canonical curves.)

Accordingly, one can test the parametric values of the solutions on the canonical curve associated with a given location in canonical space against a particular parametric range covered by the stroked curve in canonical space to see if the location has a solution that falls within this particular parametric range.

As will be understood by those skilled in the art, although the stroked curve will typically be represented by a plurality of parametric ranges (e.g. by "x" values and "y" values when the canonical curve is the fundamental quadratic curve), it is enough to only test against one parametric range since if a point is within the section of the canonical curve covered by the stroked curve it will be within each parametric range of the curve however the range is defined. Thus, for example, for a canonical curve of the form $y=x^2$, preferably the "x" value of a solution only is tested against the range of "x" values associated with the portion of the received stroked curve in canonical space. "x" is preferably used as the "parameter" to be tested in this embodiment since it is more accurate than using "y" in regions of canonical space in the vicinity of the origin.

In other embodiments, one can test the distance along the curve between a solution and a predetermined point on the canonical curve. For example, in the embodiment in which the canonical curve is the fundamental quadratic curve, the distance along the curve from the nadir to a solution on the canonical curve associated with a given location in canonical space can be determined, and then this distance can be compared to the particular distance range covered by the stroked curve as it appears in canonical space.

This latter embodiment is of particular benefit when the stroked curve to be rendered is to be stippled (e.g. displayed as a series of dots and/or dashes) with a given stippling pattern. For example, in a preferred embodiment, one or more stippling patterns can be stored in any suitable and desired manner, e.g. as a 1D texture, and the selected stippling pattern (using an appropriate transformation) applied to the canonical curve with respect to a predetermined point on the curve, e.g. the nadir. The distance along the curve from this predetermined point that is determined for each of the solutions associated with a given location in canonical space can then be compared to the selected stippling pattern, and the corresponding location in surface space rendered accordingly (i.e. based on whether the location is within the stroked curve as it appears in canonical space and where the solution(s) associated with the location fall in the selected stippling pattern).

Secondly, and as mentioned above, the boundary of a stroked path is defined by the set of points from which a line of a predetermined width, and which is perpendicular to the path, can be drawn to a point on the path.

Accordingly, one can test the perpendicular distances of the solutions on the canonical curve associated with a given location in canonical space, i.e. the length of the (straight) line drawn from the point (solution) on the canonical curve to the discrete location (sampling point), against half the stroke width of the stroked curve in canonical space to see if the location has a solution that falls within the stroked curve as it appears in canonical space. (The stroke width of the stroked curve in canonical space, will, as discussed above, be equal to the stroke width in user space multiplied by the scaling factor portion (component) of the transformation between user space and canonical space.)

Accordingly, the Applicants have recognised that a particularly efficient method of determining whether a given discrete location (sampling point position) in canonical space is within the stroked curve as it appears in canonical space is to identify those points on the canonical curve from which a (straight) line perpendicular to the canonical curve can be drawn to the sampling point location, and to then determine whether any of those points on the canonical curve are within a parametric range of the section of the canonical curve corresponding to the stroke curve and whether the distance between any of these points on the canonical curve and the sampling point location is less than or equal to half the stroke width of stroked curve as it appears in canonical space. If any one of the identified points on the canonical curve passes both of these tests, then the sampling point position is within the stroked curve as it appears in canonical space.

Thus, in a preferred embodiment, the step of determining whether a sampling location in canonical space is within the portion of canonical space that corresponds to the received stroked curve comprises at least one of, and preferably both of, determining whether any point on the canonical curve from which a (straight) line perpendicular to the canonical curve can be drawn to the sampling location in canonical space lies within a parametric range covered by the stroked curve in canonical space and whether the length of the (straight) line drawn between the sampling location in canonical space and the one or more points on the canonical curve to which a (straight) line perpendicular to the canonical curve can be drawn are less than or equal to half the stroke width of the stroked curve as it appears in canonical space. If there is a point on the canonical curve that fulfils both of these requirements for the sampling position in canonical space being tested, then the sampling position is within the stroked curve as it appears in canonical space, and accordingly the corresponding sampling position in surface space is also within the stroked curve (therefore allowing the sampling position in surface space to be shaded accordingly).

(The Applicants have further recognised that when a primitive for rendering a particular stroked curve is defined as a bounding polygon that is tightly fitted to the ends of the curve being rendered, i.e. such that all points that may be sampled within the primitive will be within the parametric range of the curve being rendered, then a determination as to whether a sampling location in canonical space is within the portion of canonical space that corresponds to the received stroked curve can be, and preferably is, made solely by determining whether the distance between the sampling location in canonical space and the solution on the canonical curve is less than or equal to half the stroke width of the curve being rendered as it appears in canonical space.)

As will be appreciated, the two steps (tests) discussed above that are preferably used to determine whether a sampling location in canonical space is within the stroked curve in canonical space can be performed in any desired order. In one preferred embodiment, the two tests are performed sequentially, with the second test only being performed for those point(s) (solution(s)) on the canonical curve that pass the first test (i.e. that are determined on the basis of the first test to potentially be within the stroked curve). This, as those skilled in the art will recognise, will allow the number of tests needed to be performed in order to determine whether a given location is within the stroked curve in canonical space to be reduced. In an alternate embodiment, however, the two tests are performed in parallel with the first test occurring simultaneously with the second test. This latter embodiment may be more convenient when using graphics hardware.

In a preferred embodiment, one or more or all of such points (solutions) on the canonical curve associated with a given discrete location (sampling point position) in canonical space can be tested in the manner described above as required to determine whether the location is within the stroked curve as it appears in canonical space or not.

For example, the Applicants have recognised that for some sections of an input stroked curve, e.g. those sections that are not associated with regions of the stroked curve having a particular characteristic(s), it is possible to correctly determine whether a particular location in canonical space (that is within one of the sections) is within the portion of the stroked curve by only testing some, but not all, and preferably only one, of a plurality of such possible points (solutions) associated with the location. Preferably, when such "testing" is used, the tested point (solution) is the closest point (solution) to the respective location in canonical space, i.e. the point (solution) that has the smallest perpendicular distance to the respective location.

The Applicants have further recognised that for other sections of an input stroked curve, e.g. those sections that are associated with regions of the stroked curve having a particular characteristic(s), one such point (solution) associated with a given location in canonical space (that is within one of the regions) may indicate that the location is within the portion of the stroked curve, whilst another such point (solution) associated with the location may indicate that the location is outside of the stroked curve as it appears in canonical space. Accordingly, in order to accurately render such regions of a stroked curve, it may be necessary to test at least two, and preferably all, of the points (solutions) associated with the location.

Thus, in a preferred embodiment, the rendering process used to render a received stroked curve, or, as discussed below, used to render a portion of a received stroked curve, may comprise testing only one, and preferably the closest, such solution associated with a location in canonical space, or it may comprise testing two or more, and preferably all, of the points (solutions) associated with a location in canonical space, to determine whether the location in canonical space is within the stroked curve or portion thereof, as appropriate, as it appears in canonical space.

Similarly, depending on how the primitives for rendering the curve are generated, it may be necessary, as discussed above, to test only some, but not all, of the data associated with a (each) given solution for a location in canonical space (or necessary to test all of the data associated with the (each) solution).

The same rendering process may be used to render an entire stroked curve. Alternatively, two or more rendering processes may be used to render a stroked curve, for example, with a first rendering process (e.g. where fewer, e.g. only one, solutions are tested) being used to render a first portion or portions of the stroked curve and a second, different, rendering process (e.g. where two or more, and preferably all, solutions are tested) being used to render a second portion or portions of the stroked curve.

The step of determining whether a sampling location in canonical space is within the portion of canonical space that corresponds to the received stroked curve, which preferably comprises the above described steps (tests), can be performed in any suitable and desired manner. However, in a preferred embodiment, it is done by looking up predetermined information (i.e. data that has been stored in advance) that allows the process to be performed.

In particular, the Applicants have recognised that the parametric location of (or distance from a predetermined point on the canonical curve to), and the perpendicular distance to the (sampling) location in canonical space for, each "solution" on the canonical curve for a given (sampling) location in canonical space can be derived in advance and stored, and then, e.g., looked-up when that location is to be tested in canonical space. This stored information relating to the (sampling) location in canonical space can then be compared with the parametric range and (half the) stroke width in canonical space for a given stroked curve being considered, to see if the location in canonical space has any solution on the canonical curve that indicates that it falls within the stroked curve being considered. Accordingly, if such data is stored for a plurality of locations (a set of sampling positions) that cover the canonical space, then a stored location can be looked-up for any given position in canonical space that may need to be tested.

Determining and storing such information in advance provides a particularly convenient and effective mechanism for carrying out these tests. Furthermore, because for each location in canonical space there will, as discussed above, be a finite number of such "solutions", it will be a relatively manageable task to store this information in respect of locations in canonical space.

Thus, in a particularly preferred embodiment, the predetermined information, as mentioned above, is stored for a plurality of discrete locations in canonical space. Most preferably, such information is stored for a regular array of sampling points that (substantially) cover the canonical space that is expected to be considered/required.

Accordingly, in a particularly preferred embodiment, there is stored, for at least one of a plurality of locations in canonical space, a parametric value for at least one of one or more points on the canonical curve to which a line that is perpendicular to the curve can be drawn from the location in canonical space, and the perpendicular distance between the at least one of one or more points on the canonical curve and the respective location in canonical space.

It should be noted that for one or more of the plurality of discrete locations in canonical space for which "solution data" is to be stored, although not all, there may not be any points on the canonical curve to which a (straight) line that is perpendicular to the curve can be drawn from the respective location(s) (i.e. there may not be any solutions on the curve for that point). Equally, there may be some locations in canonical space that have more solutions than other locations. Preferably, where there are no, or fewer, solutions for any given location for which data is to be stored, either no information is stored or, in a particularly preferred embodiment, predetermined or predefined (default) information is stored, e.g. as described in more detail below, for the "missing" solution(s).

Similarly, in a particularly preferred embodiment, the step of or means for determining whether a location in canonical space (corresponding to a sampling position in surface space) falls within the stroked curve as it appears in canonical space or not comprises looking up a data store that stores, for a plurality of locations in canonical space, a parametric value for at least one of one or more points on the canonical curve to which a line that is perpendicular to the curve can be drawn from the location in canonical space, and the perpendicular distance between the at least one of one or more points on the canonical curve and the respective location in canonical space.

The set of information relating to the array of sampling points in canonical space, e.g. the data store, can be stored in any desired and suitable manner. However, in a particularly preferred embodiment of the present invention, the information relating to the plurality of discrete locations in canonical space is stored in the form of one or more graphic textures. This is particularly advantageous and beneficial as not only are graphics textures intended to store data in respect of arrays of particular geographical locations, but also, as will be discussed further below, storing the data in the form of textures allows existing texture-mapping processes commonly incorporated in graphics processing systems to be used to render stroked curves in the manner of the present invention.

Thus, according to a third aspect of the present invention, there is provided a method of rendering a stroked curve for display in a graphics processing system, the method comprising:

receiving an input stroked curve defined in user space;

determining the portion of a canonical space that corresponds to the received stroked curve by determining the portion of a canonical curve defined in the canonical space that corresponds to the received stroked curve;

projecting the received stroked curve using a received transformation into surface space;

defining one or more primitives that cover the projected stroked curve in surface space; and then, for each of a plurality of sampling points within the one or more primitives:

determining a corresponding location in canonical space; and sampling at least one texel of one or more graphics textures, the one or more graphics textures having a plurality of texels each associated with information relating to at least one discrete location in the canonical space, to determine whether the corresponding location in canonical space is within the portion of canonical space that corresponds to the received stroked curve.

According to a fourth aspect of the present invention, there is provided an apparatus for rendering a stroked curve for display in a graphics processing system, the apparatus comprising:

means for receiving a stroked curve defined in user space;

means for determining the portion of a canonical space that corresponds to the received stroked curve by determining the portion of a canonical curve defined in the canonical space that corresponds to the received stroked curve;

means for projecting the received stroked curve using a received transformation into surface space;

means for defining one or more primitives that cover the projected stroked curve in surface space;

means for, for each of a plurality of sampling points within the one or more primitives, determining a corresponding location in canonical space; and means for sampling at least one texel of one or more graphics textures, the one or more graphics textures having a plurality of texels each associated with information relating to a discrete location in the canonical space, to determine whether the corresponding location in canonical space is within the portion of canonical space that corresponds to the received stroked curve.

It is also believed that the use of graphics textures of this form may be new and advantageous in its own right. The present invention accordingly also extends to construction of such textures and to such textures themselves.

Therefore according to a fifth aspect of the present invention, there is provided a graphics texture for use in a graphics processing system when rendering a stroked curve for display, wherein each texel of the said texture represents at least one location in a defined space, and has associated with it, for said at least one location, information relating to a curve defined in said space.

According to a sixth aspect of the present invention, there is provided a method of constructing a graphics texture for use with a graphics processing system when rendering a stroked curve for display, the method comprising:

defining a curve in a defined space;

determining, for each of a plurality of locations in said defined space, information relating to the curve defined in said space; and generating and storing a graphics texture comprising an array of texels, in which each texel corresponds to at least one of the plurality of locations in said defined space and has associated with it the determined information relating to the curve defined in said space.

According to a seventh aspect of the present invention, there is provided an apparatus for constructing a graphics texture for use with a graphics processing system when rendering a stroked curve for display, the apparatus comprising:

means for defining a curve in a defined space;

means for determining, for each of a plurality of locations in said defined space, information relating to the curve defined in said space; and means for generating and storing a graphics texture comprising an array of texels, in which each texel corresponds to at least one of the plurality of locations in said defined space and has associated with it the determined information relating to the curve defined in said space.

As will be appreciated by those skilled in that art, these aspects and embodiments of the present invention can and preferably do include any one of the preferred and optional features of the invention described herein as appropriate.

For example, the information relating to the curve defined in said space preferably comprises information relating to the position of the at least one location in the defined space relative to one or more points on the curve.

Furthermore, the curve preferably comprises a canonical curve as described above, and the one or more points on the curve preferably comprise one or more points on the curve from which a (straight) line perpendicular to the curve can be drawn to the location in said space in question.

Similarly, each texel in the one or more textures preferably has associated with it the information discussed above for the solution(s) on the canonical curve for that texel position. In other words each texel will represent at least one position in canonical space and store information relating to the solution points on the canonical curve for that position in canonical space. For example, and preferably, the information is the parametric value of the solution point(s), or the distance from a predetermined point on the canonical curve to the solution point(s), and the perpendicular distance to the curve from the solution point(s).

For example, for a four channel texture (storing RGBA), the red and green channels of the texture could store the parametric location and the perpendicular distance to the curve (or vice-versa) for one solution point for the position in canonical space in question, and the blue and alpha channels could store corresponding data for another solution point on the curve (and so on if the texture supports further data channels). Alternatively another texture, or another part of the same texture, could be used to store the data for further solutions for the location in question, if required.

Where the information is to be stored in the form of a texture, the texture(s) can be of any suitable and desired size (i.e. contain any number of texels as desired), and each texel may have any desired number of data components associated with it. However, each texel preferably has associated with it information relating to a single discrete location in the defined (canonical) space only.

The Applicants have further recognised that for any discrete location in canonical space, and wherein the canonical curve is the fundamental quadratic curve, there will only be zero (0), one (1) or two (2) associated points (solutions) from which a (straight) line perpendicular to the canonical curve can be drawn to the respective discrete location on one half of the canonical curve (i.e. if the canonical curve is split (divided) about its reflective axis of symmetry).

Thus, in a particularly preferred embodiment, where the canonical curve has a reflective axis of symmetry (e.g. passing through the nadir for a quadratic canonical curve), such that it can be split (divided) into two halves that are mirror images of each other, the information, such as that discussed above, is only stored, for each discrete location (sampling position) defined in canonical space, for the "solution" points for that location on one half of the canonical curve only.

Accordingly, in the preferred embodiment of the present invention in which for each discrete location in canonical space there is stored a parametric value of the associated identified points (solutions) on the canonical curve and the distance between the associated identified points (solutions) on the canonical curve and the respective discrete location, then in this case it will only be necessary to store, at most, four (4) components (discrete pieces of information) for each discrete location (sampling position) in canonical space, i.e. (i) a parametric value of the first (e.g. closest) identified point (solution) on the canonical curve; (ii) the distance between the first (e.g. closest) identified point (solution) on the canonical curve and the discrete location; (iii) a parametric value of the second (e.g. furthest) identified point (solution) on the canonical curve; and (iv) the distance between the second (e.g. furthest) identified point (solution) on the canonical curve and the discrete location. These four components, as will be appreciated, can conveniently be stored in a single texel of a single "four-channel" graphics texture, since such a single texel will have, as mentioned above, four data channels—a red channel, a green channel, a blue channel and an alpha channel.

Preferably, the information relating to the closest solution for each discrete location (or the appropriate data relating to a "missing solution" if there is no closest solution) is always stored in the same part (channels) of each texel for a given texture (and preferably in all the textures being used), e.g. always in the red and green channels of each texel. This can ensure that each texel (and texture) has the same common, basic configuration, and allows, particularly in relation to those embodiments in which only the closest solution for a particular sampling position is tested (as discussed above), for the system to straightforwardly test the texel data channels that store the information relating to the closest solutions.

As described above, for one or more of the discrete locations in canonical space that are associated with the one or more textures, there may be no points (solutions) on the canonical curve from which a (straight) line perpendicular to the canonical curve can be drawn to the respective discrete location, or fewer points (solutions) on the canonical curve than the number of solutions which the one or more textures are constructed to hold. For example, in the above embodiment, whilst the one or more textures are constructed such that each texel is preferably capable of storing information about two points (solutions) on the canonical curve, i.e. the maximum number of points (solutions) associated with a single discrete location, one or more of the texels may be required to only store information concerning one point (solution), or even not be needed to store information about any points (solutions) at all, i.e. those texels that are associated with locations in canonical space that only have one or no associated points (solutions) on the canonical curve.

Preferably, for those discrete locations (texels) that have fewer than the maximum number of associated points (solutions), a predetermined or predefined value is stored in the relevant "parametric" and/or "distance" component of the texel that will result in the "missing" solution failing the test to determine whether it falls within the stroked curve as it appears in canonical space or not.

For example, in a preferred embodiment, a value that will always be greater than half the stroke width of any input received curve as it appears in canonical space is stored in the "distance" component of such "missing" solutions. The associated "parametric" component of the texel in such embodiments can either be left empty (undefined) or can contain any suitable and desired value as appropriate since a solution need only fail one of the two tests for the "missing" solution to be determined as falling outside of the stroked curve as it appears in canonical space.

This helps to avoid any "missing" solutions resulting in spurious rendering effects when the texture is used in accordance with the present invention.

Where a graphics texture is to be used in the manner described above, then the texture can be sampled as desired to obtain the solution data for a given location in the canonical space.

For example, in one embodiment, the information obtained when the texture is sampled may be the stored information relating to the nearest texel to the position in canonical space to be sampled.

However, in a particularly preferred embodiment, the texture is sampled using a suitable texture filtering or interpolation process, such as, and preferably, bilinear filtering, as is known in the art. This will effectively increase the resolution of the texture and so increase the rendering accuracy. Thus, in a particularly preferred embodiment, the texture is sampled using bilinear filtering.

(It would also be possible to increase the absolute resolution of the texture by increasing the number of discrete locations in canonical space for which information is stored. However, this may not always be desirable. The use of a filtering or interpolation process when sampling the texture thus provides an alternative way of increasing the rendering accuracy without the need to increase the absolute resolution of the texture.)

In a particularly preferred embodiment, the information stored for each discrete location defined in canonical space (e.g. each texel), comprises the signed distance, rather than the absolute distance, between each of the one or more identified points on the canonical curve and the respective discrete location. The signed distance, as will be appreciated, indicates not just the distance between the two points (the absolute distance), but also on which side of the canonical curve the discrete location falls. For example, if the discrete location is above the canonical curve, then the distance is given a positive value, and if the discrete location is below then canonical curve, then the distance is given a negative value (or of course vice versa).

Using the signed distance will help to allow accurate sampling of the texture when using filtering or interpolation.

The Applicants have recognised that the value returned from a texture when it is sampled will depend upon the texture look-up (sampling) process being used, for example, depending upon whether any form of filtering or interpolation is applied when the texture is sampled and, if so, what form the filtering or interpolation takes. For example, for an identical array of texels, a texture sampling process that uses bi-linear filtering may return a different texel value for a given sampling position as compared to a texture look-up that simply takes the value of the nearest texel to the sampling position.

This can be exploited when constructing the one or more textures of the present invention to provide a better rendering result. In particular, the Applicants have recognised that if the texel values in the one or more textures are tailored or optimised to the texture sampling process (filtering) to be used when the texture is used, more accurate rendering of the stroked curve for a given texture resolution can be achieved.

Thus, in a preferred embodiment, the one or more textures are preferably tailored to the texture sampling technique to be used. In other words, the one or more textures are preferably constructed so as to take account of the particular texture sampling technique to be used with the texture(s).

For example, the texel values of the one or more textures are preferably set (calculated) so as to minimise the maximum error, and/or the sum of the local errors, after sampling with the selected texture sampling process (e.g. bi-linear filtering), rather than, for example, necessarily aiming to have the correct values at the texel centres. In a particularly preferred embodiment, the texel values are determined and selected (set) by deriving a cost function that can be used to represent the sampling process and then minimising that cost function using one or more optimisation algorithms, such as simulated annealing.

In a particularly preferred embodiment, a plurality of different textures, each representing different canonical curves and/or different parts of a given canonical curve, are generated and stored. Then for any given curve to be drawn, the texture most appropriate to that curve can be identified and selected, and used to render the curve. Accordingly, by representing a suitable range of curves in textures, then it should be possible to render a range of stroked curves.

In a preferred embodiment, a plurality of different canonical curves are represented and stored in the same texture map. This may be done by spatially separating the curves in the texture, and then sampling the appropriate area in the texture for the curve in question as is known in the art.

In a particularly preferred embodiment, a plurality of textures that each store information relating to a plurality of discrete locations in different regions of canonical space are used and stored in respect of as given canonical curve. For example, a first texture is preferably constructed (used) that stores information relating to a plurality of discrete locations in a first region of canonical space, and at least one second texture is constructed (used) that stores information relating to a plurality of discrete locations in a second region of canonical space in respect of the canonical curve.

The first and second regions of canonical space may be distinct and separate regions, or alternatively they may overlap either partially or completely. Indeed, in a preferred embodiment, the first region is wholly encompassed by the second region. For example, in the embodiment in which the canonical cure is the fundamental quadratic curve, the first region may cover an area of canonical space extending from the nadir to a first parametric location and the second region may cover an area of canonical space extending from the nadir to a second, greater parametric location.

Where the present invention is to be used, then preferably the texture(s) representing the canonical curve(s) is generated in advance, and then suitably stored for use by the graphics processing system, for example, and preferably, along with other (static) texture maps that the graphics processing system may use. A given texture is then selected, and used, as appropriate when the stroked curve in question is to be rendered.

Once it has been determined whether a sampling point within the one or more primitives in surface space falls within the stroked curve as it appears in canonical space, for example using the preferred steps of the present invention as discussed above, then the data, such as red, green and blue (RGB) colour values and an "alpha" (transparency) value, can be assigned (as required in accordance with the received stroked curve as defined in user space) to the sampling point based on the determination. This process is then preferably repeated for each of the plurality of sampling points defined in surface space, and the stroked curve rendered accordingly.

It can be seen from the above that, in a preferred embodiment of the present invention therefore, the one or more primitives are rasterised to sampling points and fragments generated, and the texture representing the appropriate canonical curve, and portion of the canonical space, sampled for each sampling point of the one or more primitives by sampling positions in the texture corresponding to the primitive sampling point positions (in the manner as is known in the art). (As discussed above, the texture should be sampled using the appropriate texture filtering process, such as, and preferably, bilinear filtering.)

The sampled texture values are then compared with the corresponding values (e.g., and preferably, the parametric range and (half the) stroke width in canonical space) for the stroked curve in question and the corresponding sampling point in surface space retained or discarded accordingly.

This "compare and discard" process can be carried out in any desired and suitable manner for the graphics processing system in question. For example, with a graphics processing system that has programmable fragment shader hardware, a compare and conditional discard routine could be, and preferably is, used.

With a graphics processing system that has fixed function hardware, this operation of the present invention can be implemented by, for example, passing the sampling points (fragments) a number of times through the graphics rendering pipeline.

For example, a first pass through the graphics rendering pipeline can be used to check whether the parametric value of one of the one or more solutions for the sampling point(s) is within a parametric range of the stroked curve as it appears in canonical space, and then a second pass through the graphics pipeline can be used, should this be necessary, to check whether the distance between the solution and the sampling location is less than or equal to half the stroked width of the stroked curve (or of course vice versa). Similar pairs of passes would then be made, if required, to check the other of the one or more points (solutions) on the canonical curve associated with the sampling location.

A dot product can be used, where necessary, to generate the absolute value of any information used in the tests as described above. For example, a dot product is preferably used to convert the signed distance to the absolute distance.

Furthermore, an (the) alpha test is preferably used to implement the comparisons needed in the test as described above.

As described above, in a particularly preferred embodiment, if a solution fails the test on its first passthrough the rendering pipeline, then it is not tested further (by passing through the pipeline a second time). This is preferably implemented using the stencil buffer.

In a particularly preferred embodiment, the various functions of the present invention are carried out on a single graphics processing platform that generates and outputs the data that is written to the frame buffer for the display device.

The present invention is applicable to any form or configuration of renderer, such as renderers having a "pipelined" arrangement (in which case the renderer will be in the form of a rendering pipeline). In a preferred embodiment it is applied to a hardware graphics rendering pipeline. The various functions and elements, etc. of the present invention can be implemented as desired, for example, and preferably, by appropriate functional units, processing logic, processors, microprocessor arrangements, etc.

The present invention is applicable to all forms of rendering, such as immediate mode rendering, deferred mode rendering, tile-based rendering, etc.

As will be appreciated from the above, the present invention is particularly, although not exclusively, applicable to 3D graphics processors and processing devices, and accordingly extends to a 3D graphics processor and a 3D graphics processing platform including the apparatus of or operated in accordance with any one or more of the aspects of the invention described herein. Subject to any hardware necessary to carry out the specific functions discussed above, such a 3D graphics processor can otherwise include any one or more or all of the usual functional units, etc., that 3D graphics processors include.

The invention similarly extends to a 2D graphics processor and to 2D graphics processing.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software, e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The invention also extends to a computer software carrier comprising such software which when used to operate a graphics processor, renderer or microprocessor system comprising data processing means causes, in conjunction with said data processing means, said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software, and such software installed on a computer software carrier, for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

DETAILED DESCRIPTION

A number of preferred embodiments of the present invention will now be described, by way of example only, and with reference to the accompanying drawings, in which.

Like reference numeral are used for like components in the Figures unless otherwise indicated.

Figure 1:
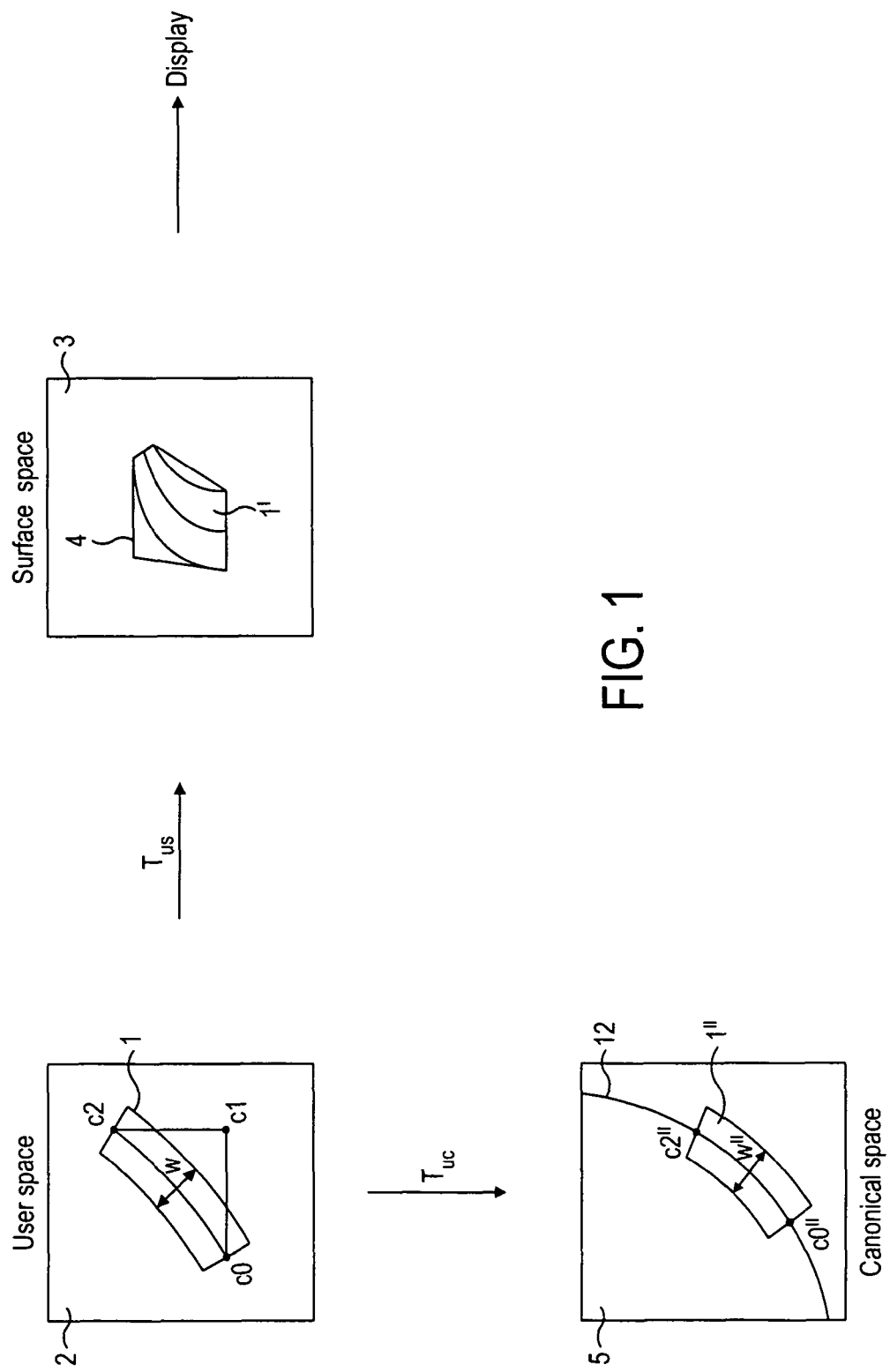
FIG. 1 shows schematically the principle processes of an embodiment of the present invention.

As shown in FIG. 1, a vector graphics object in the form of a stroked quadratic bezier curve 1 is initially defined in 2D user space 2 by: the position of start and end control points c0 and c2 of the curve 1; the position of an intermediate control point c1; and the stroke width w.

In order to render the stroked curve 1 for display, the stroked curve 1, or typically information that defines the stroked curve, is initially input to a graphics processing system.

During the rendering process, as is known in the art, the stroked curve 1 as defined in user space 2 is projected into 2D surface space 3, which has the same perspective (geometry) of the display onto which the stroked curve is to be viewed. The transformation that projects the stroked curve 1 from user space 2 to surface space 3 is commonly known as the user-to-surface transformation ($T_{US}$), and will typically involve non-uniform scaling. Accordingly, the stroke width of the projected stroked curve 1' in surface space 3 will commonly vary along the length of the curve, rather than have a single, constant value as with the stroked curve 1.

Once the stroked curve 1 has been projected into surface space 3, thereby defining the projected stroked curve 1', a primitive 4, such as the polygon shown in FIG. 1, is generated that covers the projected stroked curve 1' in surface space 3. As is known in the art, the primitive 4 is then rasterised, and the plurality of sampling points defined in the rasterisation process appropriately shaded (based on whether they fall within the area bounded by the projected stroked curve 1' or not), so as to display the projected stroked curve 1'.

In the present embodiment, this determination (of whether or not a sampling point in surface space 3 falls within the projected stroked curve 1') is made by mapping the stroked curve 1 as defined in user space 2 to a corresponding portion 1'' of canonical space 5 (referred to herein as the stroked canonical curve segment), and then determining whether a corresponding location in canonical space 5 to the sampling point in surface space 3 falls within the stroked canonical curve segment 1'' or not.

A canonical curve 12, which, as discussed above, is a predefined, single or fundamental curve that all curves within a family of curves can be transformed onto (or at least onto a portion of) using only translation, rotation and/or uniform scaling, is defined in canonical space 5. For example, in the present embodiment where the stroked curve 1 as defined in user space 2 is a quadratic curve, the canonical curve 12 is the curve $y=x^2$.

As will be appreciated, in order to implement the present embodiment, it is necessary to determine the user-to-canonical transformation ($T_{UC}$), i.e. the transformation that maps the stroked curve 1 as defined in user space 2 to a corresponding portion 1'' of the canonical curve 12.

Figure 2I:
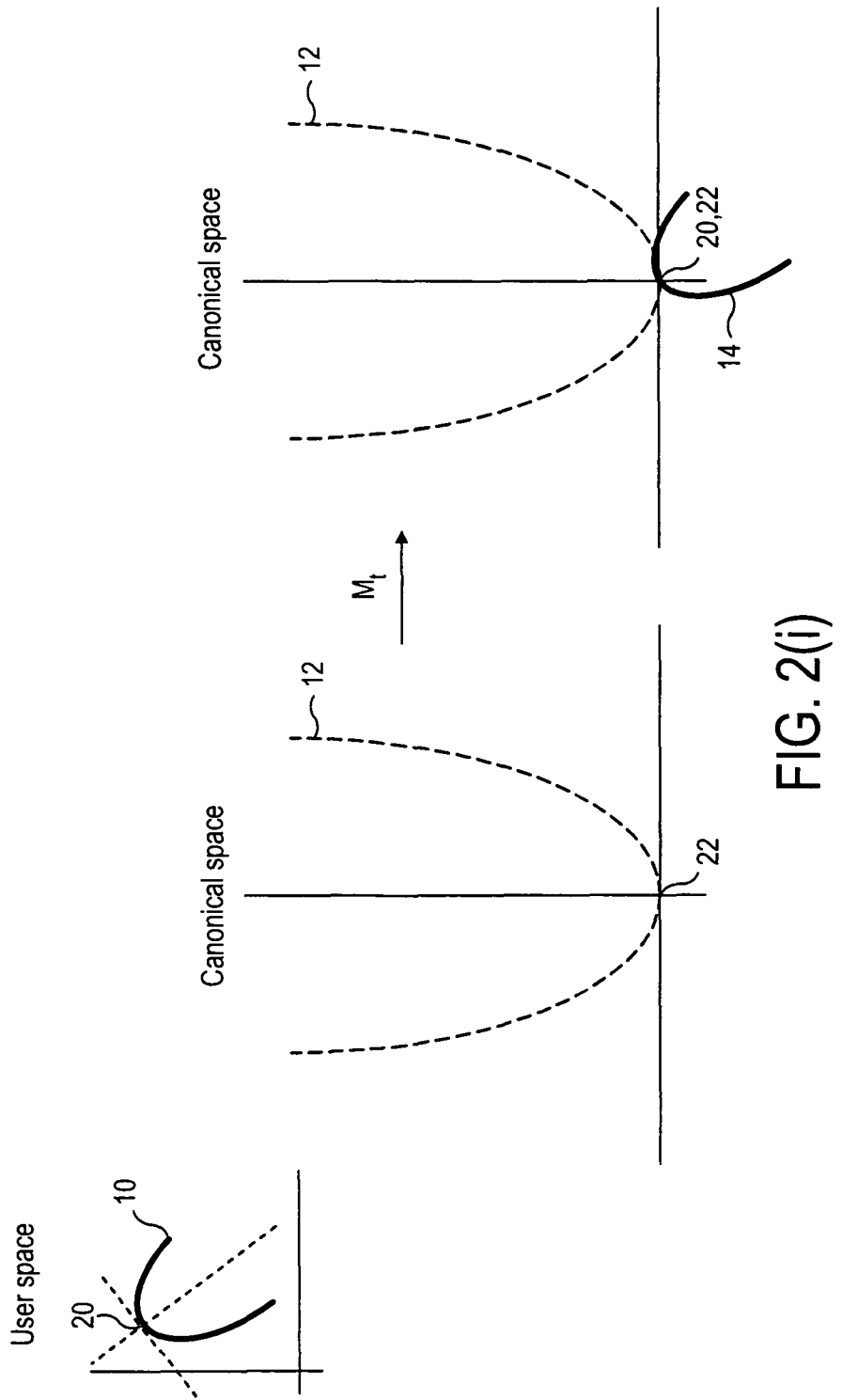
FIG. 2 illustrates the determination of the transformation needed to map an input stroked curve to a corresponding portion of the canonical curve.

The manner in which in which the user-to-canonical transformation is derived in the present embodiment for any given input quadratic bezier curve is shown in FIG. 2.

As is known in the art, a general quadratic bezier curve is defined by:

$$\langle x(t), y(t) \rangle = P(t) = P_0(1-t)^2 + 2P_1 t(1-t) + P_2 t^2, \text{where } t \in [0, 1]$$

whereas the canonical quadratic curve is defined by:

$$\langle x(t'), y(t') \rangle = \langle t', t'^2 \rangle$$

The user-to-canonical transformation, as mentioned above, consists only of translation (as defined by a matrix $M_t$), rotation (as defined by a matrix $M_r$) and/or uniform scaling (as defined by a matrix $M_s = kI$, where k is a constant and I is the identity matrix).

The first stage of the process for determining the user-to-canonical transformation in the present embodiment is to determine the translation component of the transformation (the translation matrix $M_t$). The required translation is determined as being that needed to translate the nadir (bottom point) 20 of the input quadratic bezier curve 10 in user space 2 to the nadir 22 of the canonical curve 12 (at the origin (0,0)) in canonical space 5—see FIG. 2(*i*). The nadir 20 of the input curve 10, as will be appreciated, is the point on the curve with the largest curvature, and, since the curve is a quadratic curve, is also the point at which a change in the parameter t produces the smallest change in position on the curve.

The distance between two points (x,y) and (x+Δx, y+Δy) on the input curve 10 is given by $\sqrt{\Delta x^2 + \Delta y^2}$, which in the limit in which Δx and Δy tend to zero leads to the infinitesimal change in location on the curve being given by $D(t) = \sqrt{x'(t)^2 + y'(t)^2}$, where ' denotes differentiation with respect to t. Accordingly, the location of the nadir 20 of the input curve 10 is determined by calculating the value of t at which D'(t)=0, which is equivalent to solving $(D(t)^2)'=0$, and has the following solution:

$$a_x = x_0 - 2x_1 + x_2$$
$$a_y = y_0 - 2y_1 + y_2$$
$$b_x = 2x_1 - 2x_0$$
$$b_y = 2y_1 - 2y_0$$
$$t = \frac{a_x b_x + a_y b_y}{-2(a_x^2 + a_y^2)}$$

where: $(x_0, y_0)$ is the position of the start control point c0 of the stroked curve 1 in user space 2 (whose centre curve is the input quadratic bezier curve 10); $(x_1, y_1)$ is the position of the intermediate control point c1 of the stroked curve 1; and $(x_2, y_2)$ is the position of the end control point c2 of the stroked curve 1.

By inserting the above value of t into the equations for x(t) and y(t), the (x,y) coordinates of the nadir 20 in user space 2 can be determined, and thus the translation needed to move the nadir 20 of the input curve 10 to the nadir 22 of the canonical curve 12 (i.e. to the origin (0,0) in canonical space 5) can be determined.

Once the translation component of the user-to-canonical transformation has been determined, the rotation component (i.e. the rotation matrix $M_r$) is next determined. This process is shown in FIG. 2(*ii*).

The required rotation is determined by locating two general points 30, 32 on the translated input curve 14 in canonical space 5 that are equidistant from the nadir 22. A line 34 can then be drawn between these two points, and the required rotation is that needed to make this line horizontal (i.e. such that all points on the line have the same y value).

The rotation matrix $M_r$ that will take coordinates (supplied as a column vector) on the translated input curve 14 to the canonical curve 12 can thus be calculated as being:

$$p_x = 2a_x t + b_x$$
$$p_y = 2a_y t + b_y$$
$$r_x = \frac{p_x}{\sqrt{p_x^2 + p_y^2}}$$
$$r_y = \frac{p_y}{\sqrt{p_x^2 + p_y^2}}$$

-continued
$$M_r = \begin{bmatrix} r_x & r_y \\ -r_y & r_x \end{bmatrix}$$

Finally, the uniform scaling component (i.e. the scaling matrix $M_s$) of the user-to-canonical transformation is determined. This is shown in FIG. 2(*iii*).

As will be appreciated, the input curve 10 in user space 2 once having been suitably translated and rotated into canonical space 5, i.e. the curve 16 in FIG. 2(*iii*), is now of the form $y = kx^2$, where k is the scaling factor to be determined. Therefore, if the length of the line 34 between points 30 and 32 defined in order to calculate the rotation matrix is $2l_1$, and the length of the line extending from the midpoint of this line to the nadir of the curve 16 at the origin is defined as being $l_2$, then the required level of scaling is:

$$k = \frac{l_2}{l_1^2} = \sqrt{\frac{a_x^2 + a_y^2}{p_x^2 + p_y^2}}$$

Once the user-to-canonical transformation, i.e. $T_{UC} = M_s M_r M_t = k M_r M_t$, needed to map the centre curve of the input stroked input curve 1 as defined in user space 2 onto the corresponding portion of the canonical curve 12 has been calculated, the actual section of canonical space 5 covered by the stroked canonical curve segment 1" can be determined by applying the determined transformation to the parameters of the input stroked curve 1. This process is illustrated in FIG. 3.

Figure 3:
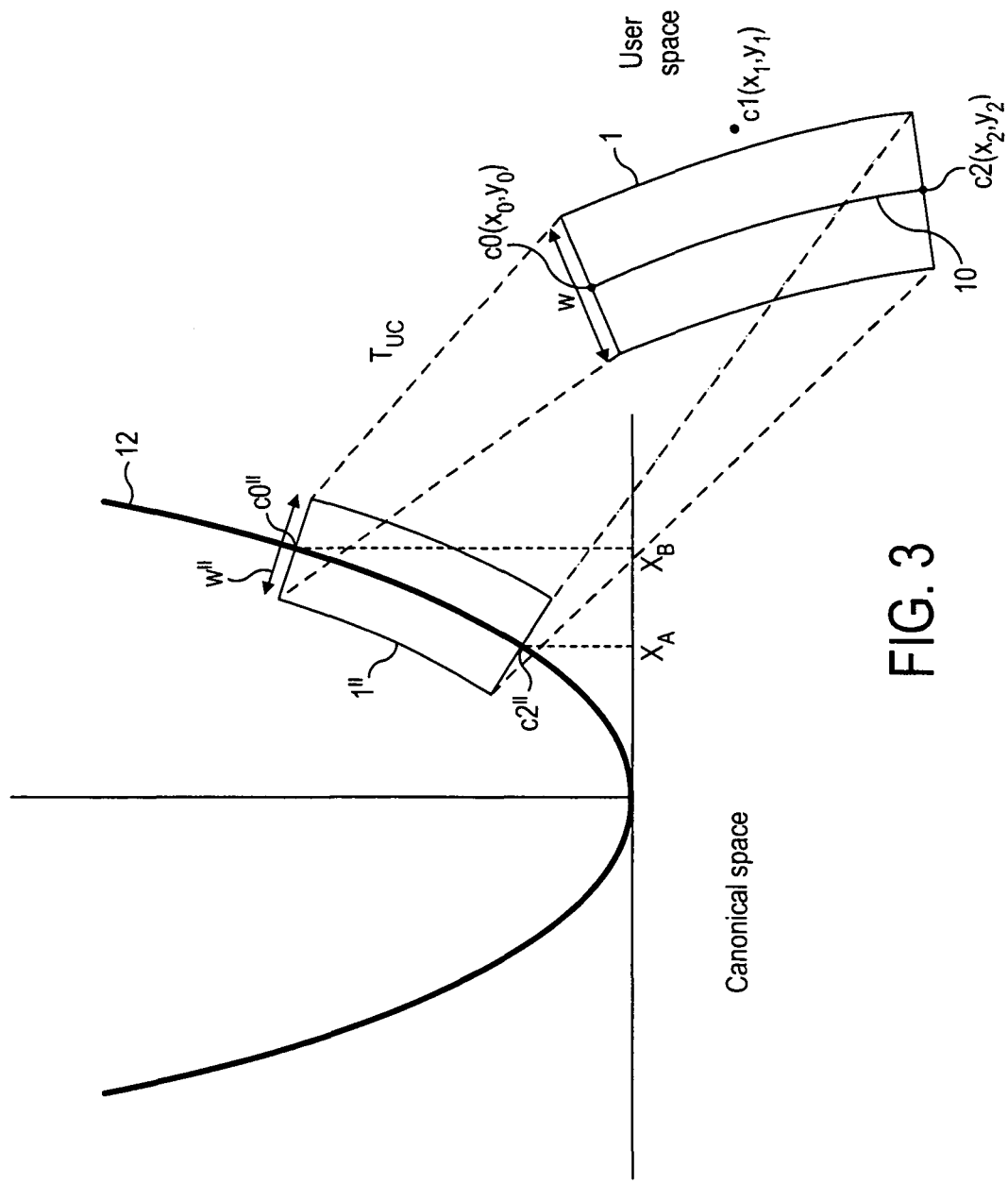
FIG. 3 shows schematically the transformation of a stroked curve in user space onto a corresponding portion of the canonical curve in canonical space.

As shown in FIG. 3, the input stroked curve 1 as defined in user space 2, and having control points c0, c1 and c2 and a stroke width w, is mapped using the user-to-canonical transformation to the corresponding portion 1" of the canonical curve. Due to the nature of the user-to-canonical transformation, the stroked canonical curve segment 1" is itself a stroked curve with a single stroke width w", and which extends between start point c0" on the canonical curve 12 and end point c2".

The start and end points c0", c2" of the stroked canonical curve segment 1" define the parametric (x) range of the input stroke curve 1 in canonical space 5. Therefore, as shown in FIG. 3, the stroked canonical curve segment 1" has a parametric range extending between parametric locations $x_A$ and $x_B$.

Moreover, the stroke width w" of the stroked canonical curve segment 1", since Euclidean distances scale linearly under the application of uniform scaling, will equal kw, i.e. the stroke width w of the input stroked curve 1 as defined in user space multiplied by the scaling factor k of the user-to-canonical transformation.

In the present embodiment, as mentioned above, to determine whether a sampling point within the primitive 4 in surface space 3 is within the projected stroked curve 1' or not, the sampling point is mapped to a corresponding location in user space 2 using the inverse of the user-to-surface transformation, and then this location in user space 2 is mapped to a corresponding location in canonical space 5 using the user-to-canonical transformation. Finally, a determination is made as to whether or not the corresponding location in canonical space 5 is within the stroked canonical curve segment 1".

A location in canonical space 5 is defined as being inside the stroked canonical curve segment 1" if it is possible to draw a straight line from the location in canonical space 5 to a point on the canonical curve 12 (which forms the centre curve for the stroked canonical curve segment 1"), such that the line is perpendicular to the curve and has a length less than or equal to half the stroke width (of the stroked canonical curve segment 1"). Any location (point) in canonical space 5 that does not meet this condition will be outside of the stroked canonical curve segment 1".

This determination is made in the present embodiment utilising a second property of the canonical quadratic curve, namely that for any point in the plane of the canonical curve, the number of points on the curve to which a line can be drawn from the point in the plane, and that is perpendicular to the curve, is bounded by a constant K. Therefore, in other words, for any point ((x,y) location) in canonical space 5 it is possible to draw a line that is perpendicular to the canonical curve 12 from that point to an integer number of points on the canonical curve 12. Thus, for each (x,y) location in canonical space there will be an integer number n of solutions (such points on the curve), where n=0, 1, 2, 3.

Figure 4:
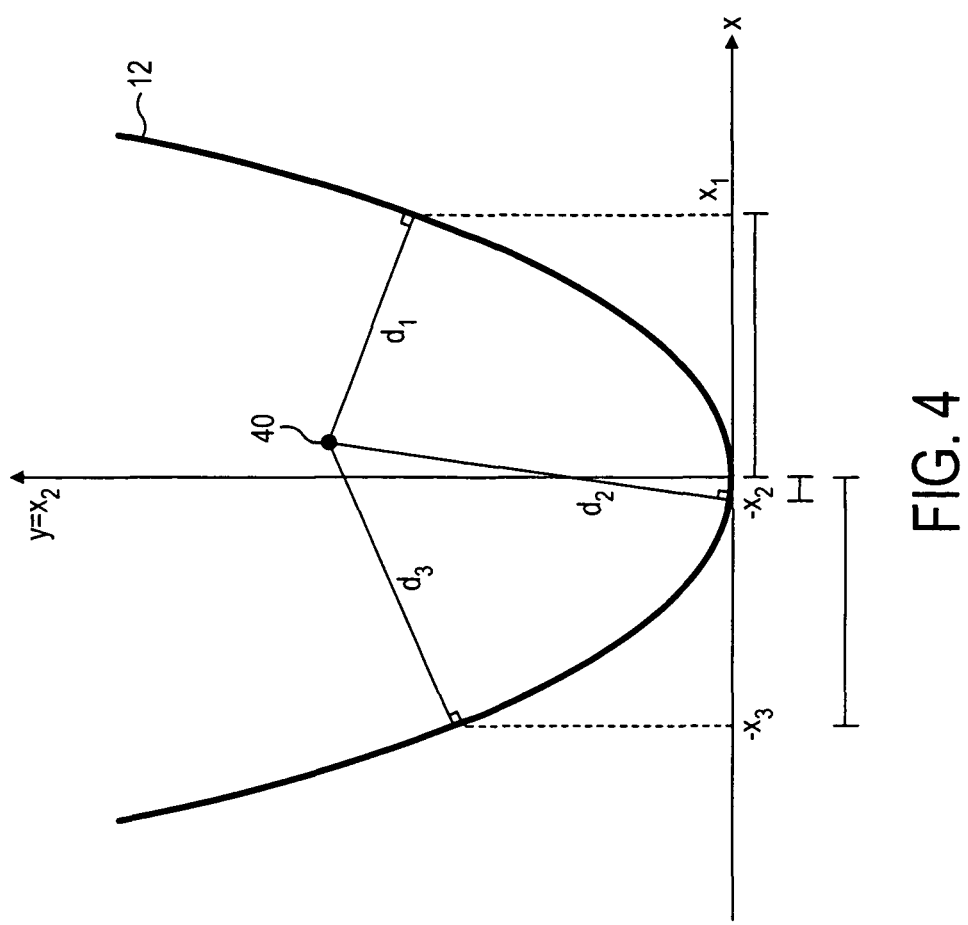
FIG. 4 shows the quadratic canonical curve in canonical space, and the solutions on the canonical curve associated with a particular location in canonical space.

For example, as shown in FIG. 4, a point 40 in canonical space 5 has three such solutions. The first solution, i.e. where the perpendicular line "hits" the curve 10, is at $x=x_1$, and the resultant line from the point 11 to the curve 10 at the point $x=x_1$ has a length $d_1$. The second and third solutions are at $x=-x_2$ and $x=-x_3$, respectively, with the associated lines having lengths $d_2$ and $d_3$, respectively.

Accordingly, it will be noted that each solution on the canonical curve 12 associated with a point (location) in canonical space 5 is defined by two pieces of information: firstly its parametric (x) value; and secondly its perpendicular distance from the point (location) in canonical space 5.

These two pieces of information about each solution on the canonical curve for a particular location in canonical space 5 are used in the present embodiment, as discussed in more detail below with reference to FIG. 5, to determine whether the particular location is within the stroked canonical curve segment 1" or not.

Figure 5:
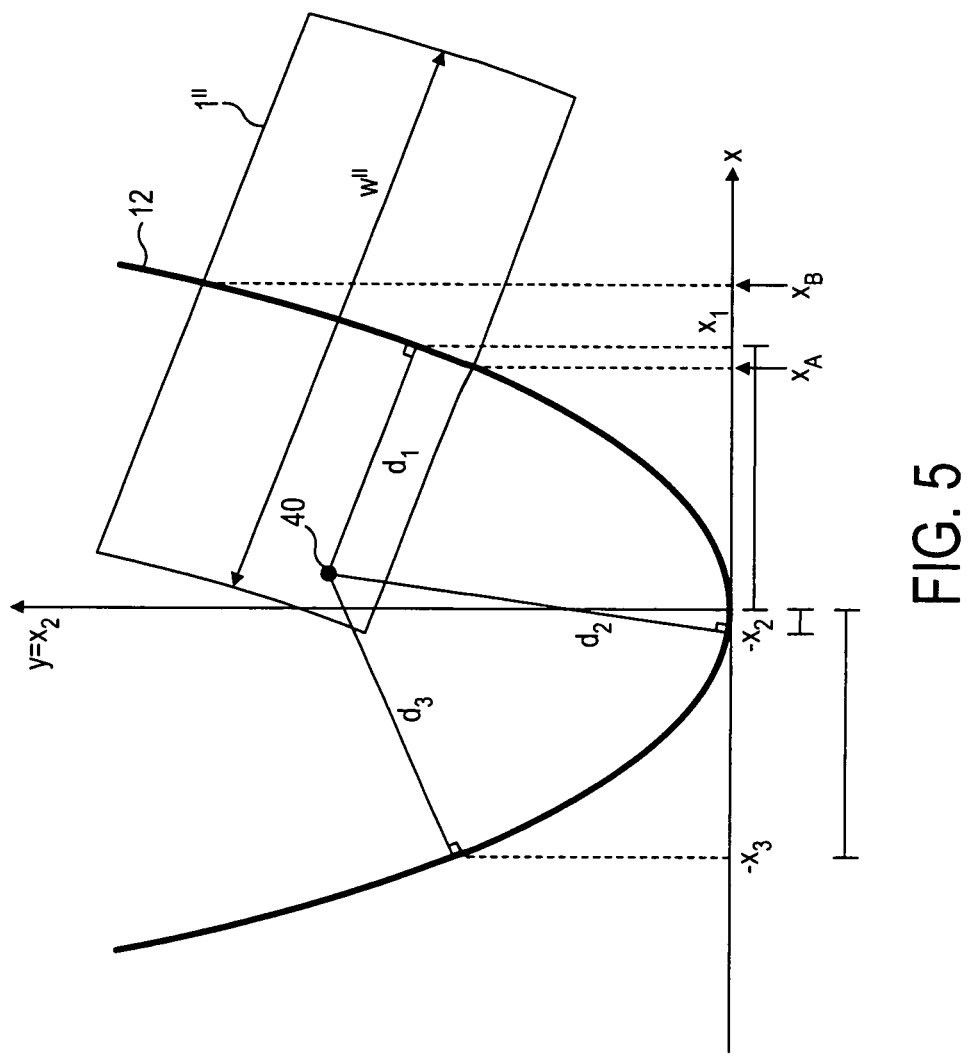
FIG. 5 shows the portion of the canonical curve that corresponds to the input stroked curve overlaid on the quadratic canonical curve of FIG. 4.

FIG. 5 shows the stroked canonical curve segment 1" overlaid onto the quadratic canonical curve previously shown in FIG. 4, with the stroked canonical curve segment 1" extending over the range of x values $x_A \leq x \leq x_B$, and having an associated stroke width w".

To determine whether the point 40 in canonical space is within the stroked canonical curve segment 1", it is firstly determined whether at least one of the solutions associated with the point 40 fall within the range $x_A \leq x \leq x_B$. As shown in FIG. 5, it can be seen that the first solution for the point 40 has a parametric (x) value of $x_1$, which lies within the desired range. It is next determined whether this first solution has a perpendicular distance that is less than or equal to half the stroke width w". As can again be seen from FIG. 5, the perpendicular distance $d_1$ for the point 40 is less than w"/2. Accordingly, the point 40 lies within the stroked canonical curve segment 1".

Such testing is implemented in the present embodiment by storing the above two pieces of information for solutions associated with a plurality of discrete locations defined in canonical space 5. In the present embodiment, this is done for a regular array of locations in canonical space 5, although this is not essential and the locations can be defined at any desired points within canonical space 5.

In the present embodiment, the above information is stored in the form of one or more specially constructed graphics textures. As described above, this is particularly advantageous, since by storing data in this form, existing texture-mapping processes of graphics processing systems can be used to render the stroked curve.

As is known in the art, each texel (texture element) of a graphics texture typically has four channels: a red channel; a green channel; a blue channel; and a alpha channels, and so commonly stores four separate pieces of data. In the present embodiment, therefore, the set of values for a first solution (i.e. parametric value and distance) is stored in the red and green channels of a texel, and the set of values for a second solution is stored in the blue and alpha channels of the texel.

Whilst it is therefore possible for any location in canonical space that has more than two solutions to store the required information in two or more texels of the graphics texture, in the present embodiment, all input stroked curves received by the graphics processing system are split along the nadir, which means that it is only necessary to store those solutions with non-negative parametric values for which there are only a maximum of two for any location in canonical space 5. Accordingly, in the present embodiment, there is a one-to-one correspondence between a texel of the graphics texture and a location in canonical space 5.

For example, a graphics texture used in the present embodiment that included information associated with the point 40 in FIG. 4, would only store the set of values for the first solution, i.e. $(x_1, d_1)$, but not the set of values for the second and third solutions, i.e. $(-x_2, d_2)$ and $(-x_3, d_3)$. For a point in canonical space that is a mirror image of the point 40 (i.e. that has been reflected in the y-axis), and which therefore has the solutions $(-x_1, d_1)$, $(x_2, d_2)$, and $(x_3, d_2)$, the graphics texture would store the set of values for the second and third solutions, but not the first solution.

Figure 6:
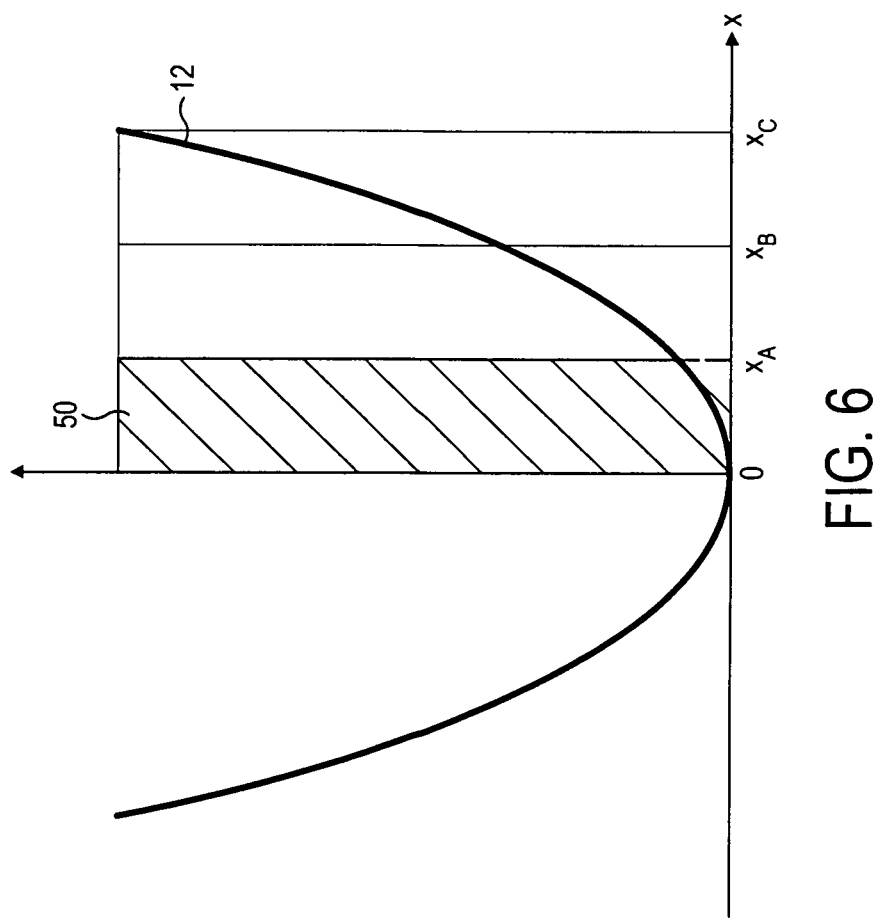
FIG. 6 illustrates the sub-division of the canonical curve into separate sections each of which is associated with a specific texture.

In the present embodiment, a plurality of graphics textures are in fact constructed, each associated with specific sections (parametric ranges) of the canonical curve. For example, and with reference to FIG. 6, a first texture is constructed for the section of the canonical curve 12 between $0 \leq x < x_A$ (i.e. solutions are stored for a plurality of discrete locations defined in the shaded area 50), a second texture is constructed for the section of the canonical curve 12 between $0 \leq x < x_B$, and a third texture is constructed for the section of the canonical curve between $0 \leq x < x_C$. Creating multiple textures in this manner means that, in most situations, any input stroked curve 1 received by the graphics processing system can be split at the nadir (if necessary), and each section of the input stroked curve 1 rendered using only a single texture.

Whilst, as described above, some points in canonical space 5 will have more than one associated solution on the canonical curve 12, it has been found that it is not always necessary to test all of these solutions to determine whether the point is within the stroked canonical curve segment 1" or not.

For example, when a stroked curve is determined not to contain any self-overlapping regions (which arise when the radius of curvature of the centre curve is smaller than half the stroke width), then it is only necessary to test whether the closest solution for a particular sampling position is within the stroked canonical curve segment 1", i.e. only the first two components of a texel are sampled.

If, however, a stroked curve is determined to contain one or more regions of self-overlap, then the possibility exists that one of a plurality of solutions associated with a point in canonical space 5 is, when tested, found to be inside the stroked canonical curve segment 1", whilst another solution associated with the point is found to be outside of the stroked canonical curve segment 1". For such points it is typically necessary (although not always) to test both of the solutions associated with a particular sampling position in canonical space 5 to determine whether it is within the stroked canonical curve segment 1", i.e. all four components of a texel are sampled.

Similarly, if the primitive(s) covering the stroked curve are tightly bound to the ends of the curve it may only be necessary to test the distance value, but not the parametric value, of each solution being tested.

In the present embodiment, as discussed above, to determine whether a sampling point in surface space 3 is within the projected stroked curve 1', the sampling point is mapped to a corresponding location in canonical space 5. This location in canonical space 5 may correspond exactly to a location for which associated solutions are stored in a texture. It will often be the case, however, that the location in canonical space 5, which corresponds to the sampling point in surface space 3, will not correspond exactly to a location for which associated solutions are stored in a texture. The texture is accordingly sampled using a suitable filtering or interpolation process. For example, in the present embodiment, the texture is sampled using a bilinear interpolation process, in which stored data relating to the four nearest locations to the desired location is obtained, and a weighted average taken to determine the data for the desired location. Then, the interpolated data is used in the manner described above to determine whether at least one of the solutions for that location passes both the tests for determining whether the location is within the stroked canonical curve segment 1". If one of the solutions passes both tests, the location is within the stroked canonical curve segment 1", and sampling point in surface space 3 is shaded accordingly.

In order for this bilinear interpolation process to be properly implemented, in the present embodiment, the signed distance is stored in the specially constructed textures rather than the absolute distance. In other words, each stored value is given a sign, either positive or negative, depending on whether the associated location in canonical space 5 is above or below the canonical curve 12.

As will be recognised, some of the texels within the texture will not have defined values for all four of the components. For example, those texels corresponding to sampling positions in the lower left quadrant of canonical space, i.e. x<0 and y<0, have no solutions with non-negative parametric values, and as such do not have defined values for any of the four components of the texture. In addition, those texels corresponding to sampling positions that only have one solution (rather than the maximum two solutions), e.g. point 40 in FIGS. 4 and 5, will only have defined values for the first two components of the texture. To take account of these "missing" solutions, and to avoid any potential false-positive results in the testing procedure, the distance component of the "missing" solution in the associated texel is given a value that is larger than any (half) stroke width that it will ever be compared against.

It will also be recognised that it is only texels corresponding to sampling positions in the upper left quadrant of canonical space, i.e. x<0 and y>0, that have two distinct solutions, and thus have defined values for all four components of the texture. Accordingly, it is possible to optimise the texture storage in the present embodiment by creating two separate textures, the first texture storing the set of values for the first solution for discrete locations in all four quadrants of canonical space 5, and the second texture storing the set of values for the second solution for discrete locations in the upper left quadrant of canonical space only. (The second texture is therefore only a quarter of the size of the first texture.)

Figure 7:
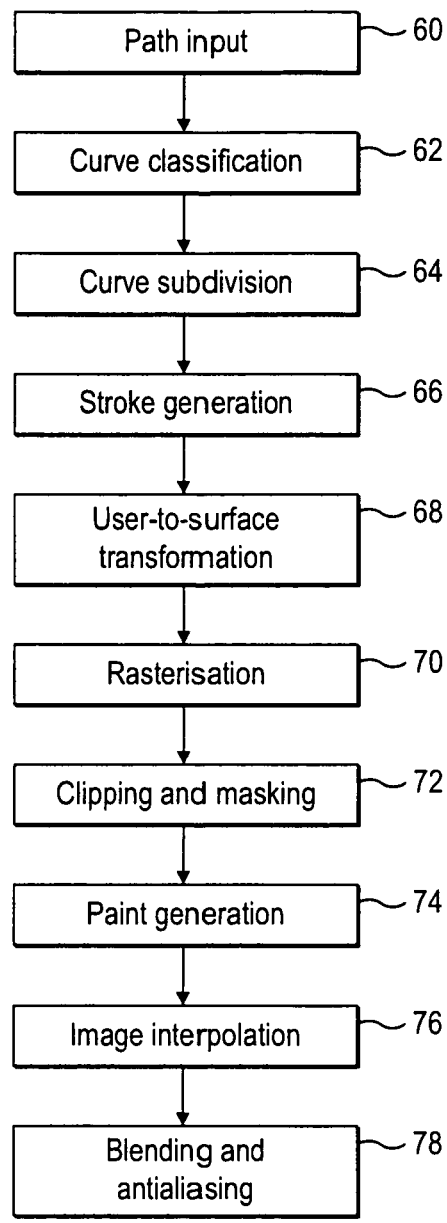
FIG. 7 shows the rendering pipeline associated with the preferred embodiment.

FIG. 7 illustrates the rendering pipeline using in the present embodiment to render a stroked curve.

Firstly, in step 60 a stroked curve is defined in user space. In step 62, the stroked curve is classified, and so for example is determined to be a quadratic curve, a elliptical arc or a cubic curve. If the stroked curve is determined to be an elliptical arc or a cubic curve, the curve is accordingly subdivided into a plurality of quadratic curve segments, see step 64.

Next, the quadratic curve, or each quadratic curve segment, to be rendered is input to the graphics processing unit (GPU) of the system, and the associated stroked curve generated within the GPU (see step 66). Then, in the manner described above, the input stroked curve is transformed into surface space using the user-to-surface transformation (step 68) and a primitive covering the transformed stroked curve is generated and rasterised (step 70).

Using the processes described above, it is then determined whether each of the sampling points determined in the rasterisation process are within the transformed stroked curve or not, and based on this determination the sampling points are shaded accordingly. This latter step, as is known in the art, is typically divided into steps of clipping and masking (step 72), paint generation (step 74), image interpolation (step 76), and blending and antialiasing (step 78).

The processes of the present invention can be implemented using any suitable conventional, existing graphics processing systems.

For example, on programmable graphics hardware, these processes can be straightforwardly implemented in a fragment shader.

On fixed-function hardware, the present embodiment invention can be implemented using a number of passes through the rendering pipeline. For example, for each solution for a desired sampling location in canonical space 5, a first pass can be used to check the parametric range, and a second pass used to check the distance to the curve (or vice versa). A dot product is used to convert the signed distance to the absolute distance for use in the tests, and the various comparisons are implemented using the alpha test. The stencil buffer is also used to allow the two passes to communicate information to each other such that those solutions that pass the first test are passed through the pipeline a second time for the second test.

It can be seen from the above that the present invention, in its preferred embodiments a least, provide a method and apparatus for rendering stroked paths, and stroked curves in particular, inter alia, on traditional fixed function 3D graphics hardware and on unmodified, existing hardware graphics accelerators, in a substantially more efficient manner (in terms of load on the CPU) than is possible with conventional techniques.

The invention claimed is:

1. A method of rendering a stroked curve for display in a graphics processing system, the method comprising:
    receiving an input stroked curve defined in a user space by a centre curve and an associated stroke width;
    determining a portion of a canonical space that corresponds to the received stroked curve;
    wherein the portion of the canonical space has a length defined by a portion of a canonical curve in the canonical space which corresponds to the received stroked curve, and a width defined by the associated stroke width multiplied by a scaling factor component of a transformation between the user space and the canonical space;
    projecting the received stroked curve using a received transformation into a surface space;
    defining at least one primitive that covers the projected stroked curve in the surface space; and
    for each of a plurality of sampling points within the at least one primitive:
        mapping the sampling point to a corresponding location in the canonical space;

determining whether the corresponding location is within the portion of the canonical space that corresponds to the received stroked curve; and assigning data for rendering the received stroked curve to the sampling point if the corresponding location is within the portion of the canonical space that corresponds to the received stroked curve;

wherein said step of determining whether the corresponding location is within the portion of the canonical space that corresponds to the received stroked curve comprises determining whether the length of a line extending perpendicularly from the canonical curve to the corresponding location in the canonical space is less than or equal to half the associated stroke width multiplied by the scaling factor component.

2. The method as claimed in claim 1, wherein the step of determining whether the corresponding location is within the portion of the canonical space that corresponds to the received stroked curve comprises looking up predetermined information that is stored for a plurality of discrete locations in canonical space.

3. The method as claimed in claim 2, wherein the predetermined information comprises the perpendicular distance between the point on the canonical curve and the corresponding location.

4. The method as claimed in claim 2, wherein the predetermined information is stored in at least one graphics texture.

5. One or more non-transitory, computer-readable storage media comprising computer software code to perform the method of rendering a stroked curve for display as claimed in claim 1 when executed on a data processor of a graphics processing system.

6. A method of rendering a stroked curve for display in a graphics processing system, the method comprising:
   receiving an input stroked curve defined in a user space by a centre curve and an associated stroke width;
   determining a portion of a canonical space that corresponds to the received stroked curve;
   wherein the portion of the canonical space has a length defined by a portion of a canonical curve in the canonical space which corresponds to the received stroked curve, and a width defined by the associated stroke width multiplied by a scaling factor component of a transformation between the user space and the canonical space;
   projecting the received stroked curve using a received transformation into a surface space;
   defining at least one primitive that covers the projected stroked curve in the surface space; and
   then, for each of a plurality of sampling points within the at least one primitive:
      mapping the sampling point to a corresponding location in the canonical space; and
      sampling at least one texel of at least one graphics texture for the corresponding location, the at least one graphics texture having a plurality of texels each associated with information relating to at least one discrete location in the canonical space, to determine whether the corresponding location is within the portion of the canonical space that corresponds to the received stroked curve;
   wherein said step of determining whether the corresponding location is within the portion of the canonical space that corresponds to the received stroked curve comprises determining whether the length of a line extending perpendicularly from the canonical curve to the corresponding location in the canonical space is less than or equal to half the associated stroke width multiplied by the scaling factor component.

7. The method as claimed in claim 6, comprising:
   selecting a graphics texture from a plurality of graphics textures available for use by the graphics processing system that each store information relating to a plurality of discrete locations in different regions of canonical space based on the received stroked curve; and
   sampling at least one texel of the selected graphics texture to determine whether the corresponding location in canonical space is within the portion of canonical space that corresponds to the received stroked curve.

8. One or more non-transitory, computer-readable storage media comprising computer software code to perform the method of rendering a stroked curve for display as claimed in claim 6 when executed on a data processor of a graphics processing system.

9. An apparatus of rendering a stroked curve for display in a graphics processing system, the apparatus comprising:
   processing circuitry arranged to receive an input stroked curve defined in a user space by a centre curve and an associated stroke width;
   processing circuitry arranged to determine a portion of a canonical space that the received stroked curve corresponds to;
   wherein the portion of the canonical space has a length defined by a portion of a canonical curve in the canonical space which corresponds to the received stroked curve, and a width defined by the associated stroke width multiplied by a scaling factor component of a transformation between the user space and the canonical space;
   processing circuitry arranged to project the received stroked curve using a received transformation into a surface space;
   processing circuitry arranged to define at least one primitive that covers the projected stroked curve in the surface space; and
   processing circuitry arranged, for each of a plurality of sampling points within the at least one primitive:
      to map the sampling point to a corresponding location the canonical space;
      to determine whether the corresponding location is within the portion of the canonical space that corresponds to the received stroked curve; and
      to assign data for rendering the received stroked curve to the sampling point if the corresponding location is within the portion of the canonical space that corresponds to the received stroked curve;
      wherein said step of determining whether the corresponding location is within the portion of the canonical space that corresponds to the received stroked curve comprises determining whether the length of a line extending perpendicularly from the canonical curve to the corresponding location in the canonical space is less than or equal to half the associated stroke width multiplied by the scaling factor component.

10. The apparatus as claimed in claim 9, wherein the processing circuitry arranged to determine whether the corresponding location is within the portion of the canonical space that corresponds to the received stroked curve is arranged to look up predetermined information that is stored for a plurality of discrete locations in canonical space.

11. The apparatus as claimed in claim 10, wherein the predetermined information comprises the perpendicular distance between the point on the canonical curve and the corresponding location.

12. The apparatus as claimed in claim 10, wherein the predetermined information is stored in at least one graphics texture.

13. An apparatus of rendering a stroked curve for display in a graphics processing system, the apparatus comprising:
- processing circuitry arranged to receive an input stroked curve defined in a user space by a centre curve and an associated stroke width;
- processing circuitry arranged to determine a portion of a canonical space that corresponds to the received stroked curve;
- wherein the portion of the canonical space has a length defined by a portion of a canonical curve in the canonical space which corresponds to the received stroked curve, and a width defined by the associated stroke width multiplied by a scaling factor component of a transformation between the user space and the canonical space;
- processing circuitry arranged to project the received stroked curve using a received transformation into a surface space;
- processing circuitry arranged to define at least one primitive that covers the projected stroked curve in the surface space; and
- processing circuitry arranged, for each of a plurality of sampling points within the at least one primitive:
    - to map the sampling point to a corresponding location in the canonical space; and
    - to sample at least one texel of at least one graphics texture for the corresponding location, the at least one graphics texture having a plurality of texels each associated with information relating to at least one discrete location in the canonical space, to determine whether the corresponding location is within the portion of the canonical space that corresponds to the received stroked curve;
- wherein said step of determining whether the corresponding location is within the portion of the canonical space that corresponds to the received stroked curve comprises determining whether the length of a line extending perpendicularly from the canonical curve to the corresponding location in the canonical space is less than or equal to half the associated stroke width multiplied by the scaling factor component.

14. The apparatus as claimed in claim 13, comprising:
- processing circuitry arranged to select a graphics texture from a plurality of graphics textures available for use by the graphics processing system that each store information relating to a plurality of discrete locations in different regions of canonical space based on the received stroked curve; and
- processing circuitry arranged to sample at least one texel of the selected graphics texture to determine whether the corresponding location in canonical space is within the portion of canonical space that corresponds to the received stroked curve.

* * * * *